US011880383B2

(12) United States Patent
Rauch et al.

(10) Patent No.: US 11,880,383 B2
(45) Date of Patent: Jan. 23, 2024

(54) FEDERATED DATA MANAGEMENT BETWEEN PARTNER SYSTEMS

(71) Applicant: SAP SE, Walldorf (DE)

(72) Inventors: David Rauch, Potsdam (DE); Ricarda Bethge, Potsdam (DE); Mathias Held, Potsdam (DE); Arne Scherrer, Kleinmachnow (DE); Mehran Shakeri, Berlin (DE); Kevin Ventzke, Berlin (DE); Dennis Kuhnert, Berlin (DE); Antonio Estrada Rubio, Berlin (DE)

(73) Assignee: SAP SE, Walldorf (DE)

( * ) Notice: Subject to any disclaimer, the term of this patent is extended or adjusted under 35 U.S.C. 154(b) by 647 days.

(21) Appl. No.: 16/511,485

(22) Filed: Jul. 15, 2019

(65) Prior Publication Data

US 2021/0019326 A1 Jan. 21, 2021

(51) Int. Cl.
*G06F 16/25* (2019.01)
*H04L 9/32* (2006.01)
(Continued)

(52) U.S. Cl.
CPC .......... *G06F 16/256* (2019.01); *G06F 16/137* (2019.01); *G06F 16/9027* (2019.01);
(Continued)

(58) Field of Classification Search
CPC .............................. G06F 16/256; H04L 9/3239
See application file for complete search history.

(56) References Cited

U.S. PATENT DOCUMENTS 10,503,713 B1 * 12/2019 Gattu ..................... G06F 16/125
11,151,276 B1 * 10/2021 Wang ..................... G06Q 20/02
(Continued)

FOREIGN PATENT DOCUMENTS

CN 103595696 2/2014
CN 109245894 1/2019
(Continued)

OTHER PUBLICATIONS

U.S. Appl. No. 16/511,281, Scherrer et al.
(Continued)

*Primary Examiner* — Vaishali Shah
(74) *Attorney, Agent, or Firm* — Fish & Richardson P.C.

(57) ABSTRACT

Methods, systems, and computer-readable storage media for notarized communication between platform systems is provided. A first data object is notarized by storing a first root hash value at a blockchain network. The first root hash value is notarized in response to a transaction request received through a first notarization interface instantiated at a first platform system. A subscription for the first platform system is established to provide notification events in relation to a second data object. The first root hash value comprises an object reference to a second root hash value for the second data object. A notification event is sent for the second data object to the first platform system, comprising a third root hash value of a third data object associated with the second data object. The third data objects is notarized at the blockchain network by the second platform system through a second notarization interface.

20 Claims, 9 Drawing Sheets

(51) Int. Cl.
*G06F 16/901* (2019.01)
*G06F 16/13* (2019.01)
*H04L 9/00* (2022.01)

(52) U.S. Cl.
CPC .......... *H04L 9/3236* (2013.01); *H04L 9/3239* (2013.01); *H04L 9/50* (2022.05)

(56) References Cited

U.S. PATENT DOCUMENTS

| | | | |
|---|---|---|---|
| 11,258,601 B1* | 2/2022 | Wang | H04L 9/088 |
| 2013/0036098 A1* | 2/2013 | Mutalik | G06F 16/1748 |
| | | | 707/690 |
| 2016/0099963 A1* | 4/2016 | Mahaffey | G06F 21/554 |
| | | | 726/25 |
| 2016/0162897 A1 | 6/2016 | Feeney et al. | |
| 2016/0260091 A1 | 9/2016 | Tobias | |
| 2018/0082296 A1 | 3/2018 | Brashers | |
| 2018/0091596 A1* | 3/2018 | Alvarez | H04L 67/12 |
| 2018/0293547 A1 | 10/2018 | Randhawa | |
| 2018/0322587 A1 | 11/2018 | Linne | |
| 2018/0349621 A1* | 12/2018 | Schvey | H04L 9/0637 |
| 2019/0103973 A1* | 4/2019 | Chalkias | H04L 63/0442 |
| 2019/0317934 A1 | 10/2019 | Jentzsch et al. | |
| 2020/0073962 A1 | 3/2020 | Natarajan et al. | |
| 2020/0127814 A1* | 4/2020 | Ma | H04L 63/1466 |
| 2020/0128010 A1* | 4/2020 | Kim | H04L 9/3239 |
| 2020/0195448 A1* | 6/2020 | Yang | H04L 9/3297 |
| 2020/0304289 A1* | 9/2020 | Androulaki | G06F 21/602 |
| 2021/0279762 A1 | 9/2021 | Eklund | |

FOREIGN PATENT DOCUMENTS

| | | |
|---|---|---|
| WO | 2009128010 | 10/2009 |
| WO | 2010019916 | 2/2010 |
| WO | 2014201059 | 12/2014 |
| WO | 2018039374 | 3/2018 |

OTHER PUBLICATIONS

Coindesk.com, "enable market participants to be firmly in control of when with whom, and how much they share", Mar. 3, 2019, [Retrieved on Jun. 12, 2019], retrieved from: URL <https://www.coindesk.com/the-right-way-to-do-blockchain-consortiums>, 2 pages.

* cited by examiner

US 11,880,383 B2

FEDERATED DATA MANAGEMENT BETWEEN PARTNER SYSTEMS

CROSS-REFERENCE TO RELATED APPLICATIONS

This application is related to and is a co-pending application of U.S. application Ser. No. 16/511,281 filed on Jul. 15, 2019 entitled "FEDERATED DATA MANAGEMENT BETWEEN PARTNER SYSTEMS"; now issued as U.S. Pat. No. 11,201,747 on Dec. 14, 2021.

BACKGROUND

Enterprises interact at various levels in cooperative efforts. For example, enterprises can engage each other and transactions between enterprises can occur using or otherwise recorded within one or more digital records. Management of digital records can be performed manually and can be a resource-intensive task that inherently provides insecurity during data exchange and negotiation. For example, data sharing during tracking and tracing materials in a cross-company supply chain provides value in many business scenarios and may require data verification and communication between systems associated with different technology and requirements.

SUMMARY

Implementations of the present disclosure are directed to computer-implemented methods for federated data management between partner systems. More particularly, implementations of the present disclosure are directed to notarization of root hash values corresponding to data objects by storing the root hash values in a blockchain network. Notarized root hash values at the blockchain network may be stored for use during data sharing and verification of authenticity of data between partner systems associated with the blockchain network. A light-weight system configuration is provided for notarized communication between the partner systems using the blockchain network and through peer-to-peer communication between the systems based on hash value verifications. Further, event management may be configured for the partner system based on hash references between root hash nodes stored in the blockchain network to define the hash notarization and object references. Partner systems may subscribe and receive notifications for changes and updates in relation to objects notarized.

In some implementations, actions include notarizing a first data object by storing a first root hash value for a first data object at a blockchain network, the first root hash value being notarized in response to a transaction request received through a first notarization interface instantiated at a first platform system; establishing a subscription for the first platform system to provide notification events in relation to a second data object, the first root hash value comprising an object reference to a second root hash value for the second data object, the second root hash value being notarized at the blockchain network by a second platform system; and sending a notification event in relation to the second data object to the first platform system, wherein the notification event comprises a third root hash value of a third data object notarized at the blockchain network, the third data object being notarized by the second platform system through a second notarization interface and including a notarization reference to the second root hash value associated with the second data object. Other implementations of this aspect include corresponding systems, apparatus, and computer programs, configured to perform the actions of the methods, encoded on computer storage devices.

These and other implementations can each optionally include one or more of the following features: instantiating a plurality of notarization interfaces at the plurality of platform systems for notarized communication, wherein the first platform system from the platform systems is a cloud platform system, and the second platform system is an on premise platform system; wherein the transaction request comprises as input a fourth root hash value, the fourth root hash value being stored at the blockchain network, wherein the first root hash value includes a notarization reference to the fourth root hash value to define that the first data object is a subsequent version of a fourth data object associated with the fourth root hash value; establishing a chain of notarized root hashes at the blockchain network, the chain including the first root hash value and the fourth root hash value to provide tracking of versions of a first document at the blockchain network; wherein a first document is generated at the first platform system in relation to a second document generated at the second platform system, wherein the first data object and the fourth data object are different versions of the first document, and the second data object and the third data object are different versions of the second document.

These and other implementations can each optionally include one or more of the following features: receiving a request, at a second notarization interface at the second platform system, for sharing data associated with the third data object, the request being associated with the first platform system, determining, by the second platform system, the data to be shared with the first platform system based on a visibility criterion defined in relation to the third data object and the first platform system, wherein the data includes a set of key-value pair objects associated with a first visibility level of one or more visibility levels of the third data object; and sharing the data and a hash proof for the data for verification of authenticity of the data as compared to content of the third data object, the hash proof being generated by the second platform system based on the set of key-value pair objects; in response to a data request from the first platform system to the second platform system, receiving, at the first platform system, data associated with the third data object and a hash proof for the data; calculating, at the first platform system, a root hash value based on the hash proof for the third data object, the hash proof being a Merkle proof and the root hash value being a Merkle tree root hash value; and evaluating the root hash value to determine whether the root hash value corresponds to the third root hash value to verify authenticity of the data being shared; in response to notarizing the first root hash value at the blockchain network, transmitting the first root hash for the first data object to the plurality of platform systems related to the blockchain network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
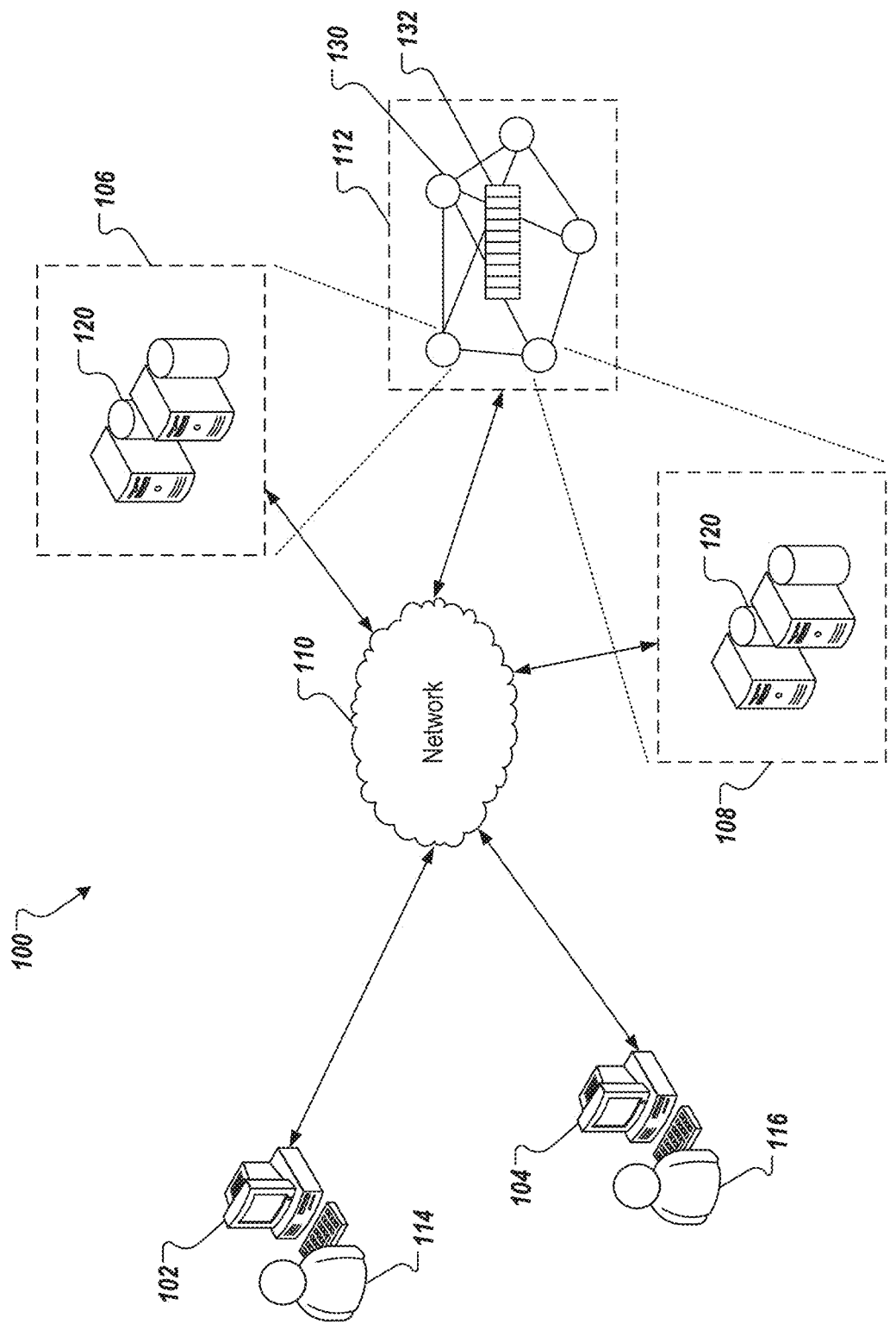
FIG. 1 depicts an example architecture that can be used to execute implementations of the present disclosure.

Implementations of the present disclosure are directed to computer-implemented methods for federated data management between partner systems. More particularly, implementations of the present disclosure are directed to notarization of root hash values corresponding to data objects by storing the root hash values in a blockchain network. Notarized root hash values in the blockchain network may be stored for use during data sharing and verification of authenticity of data between partner systems associated with the blockchain network. A light-weight system configuration is provided for notarized communication between the partner systems using the blockchain network and through peer-to-peer communication between the systems based on hash value verifications. Further, event management may be configured for the partner system based on hash references between root hash nodes stored in the blockchain network to define notarization and object references. Partner systems may subscribe and receive notifications for changes and updates in relation to objects notarized.

In some implementations, actions include notarizing a first data object by storing a first root hash value for a first data object at a blockchain network, the first root hash value being notarized in response to a transaction request received through a first notarization interface instantiated at a first platform system; establishing a subscription for the first platform system to provide notification events in relation to a second data object, the first root hash value comprising an object reference to a second root hash value for the second data object, the second root hash value being notarized at the blockchain network by a second platform system; and sending a notification event in relation to the second data object to the first platform system, wherein the notification event comprises a third root hash value of a third data object notarized at the blockchain network, the third data object being notarized by the second platform system through a second notarization interface and including a notarization reference to the second root hash value associated with the second data object.

As introduced above, implementations of the present disclosure provide a federated data management platform using a digital ledger system, also referred to herein as a blockchain network. In accordance with implementations of the present disclosure, the blockchain network provides a single source of truth for data objects that are associated with partner systems of the blockchain network.

Digital ledger technologies provide a shared truth for all participants represented by partner systems of the blockchain network. Through the provided federated data management layer between partner systems and the blockchain network, proof of existence of data objects, generated and agreed upon by partner systems, is enabled. Example data objects can include, without limitation, documents, material items, objects, images, video, and audio. Details for these data objects may be stored according to a predefined data model at a software application and an underlying database running on an example partner system.

In accordance with implementations of the present disclosure, a federated data management layer is implemented to facilitate communication between enterprises represented by corresponding partner systems of a blockchain network. Multiple enterprises may agree and configure their systems and applications to communicate with regards to related data objects using the blockchain network to provide verification of data authenticity.

Data objects may include multiple properties and corresponding properties values. In this manner, a data object may include a set of key-value pair objects corresponding to the multiple properties. For example, a data object may be an invoice including properties (attributes) such as, date of issuance, business partner identification number, contact information, items list, quantity, price, etc. Property values defined as a key-value pairs object may be in form of numbers, values, or combinations thereof.

Replication of data at a ledger system associated with multiple partner systems may be associated with high prices, thus making data-sharing using blockchain networks expensive in terms of technical resources. In accordance with implementations of the present disclosure, and as described in further detail herein, a digital fingerprint of the shared data is stored in the blockchain network instead of complete copies of the shared data. For example, the root hash values of a data object are stored. In some examples, the data object itself is only communicated on a need-to-know basis among all interested participants/partner systems of the blockchain network. Thus, when data is shared between partner systems, each partner system may verify whether the data is authentic by evaluation of a light-weight hash value using the blockchain network.

Data objects may be notarized using a notarization service provided by the federated data management layer according to implementations of the present disclosure. When a data object is notarized, a hash structure is generated for the data object. The hash structure may be a tree data structure including one or more hash values computed based on grouping of properties and properties values of the data object.

For example, the hash structure may be a Merkle tree hash structure. The lowest layer in the tree may include leaf nodes corresponding to hash values computed for key-value pairs defined for the properties of the data object. A root hash value may be defined as a root node of the Merkle tree hash structure. The notarization may be performed by executing a transaction to store a root hash value determined for the data object in a blockchain node of the blockchain network. The stored root hash value may serve as proof of a history and existence of the data objects. Blockchain protocols provide features enabling hash values for a data object to be stored when notarizing the data object for the blockchain network. When applying such an approach for notarizing a data object by storing a hash value, the complete content of the data object is not stored in the blockchain network, but may be shared among the partner systems of the blockchain network.

Additionally, when a data object is notarized, the executed transaction to store the root hash value in the blockchain network may also include as input other hash roots that are stored in the blockchain network. Data objects are provided with notarization references to the previously notarized data objects.

For example, a first data object is notarized and a first root hash value is stored in the blockchain network. When a second data object is notarized, a transaction may be executed that provides the first root hash value and a second root hash value for the second data object as input. These two root hash values are input for the transaction and a chain of hash values is created in the blockchain network. In this manner, the second data object consumes the first data object. Such a chain of hash values may provide a history for created data objects that are notarized. Evaluation of chains of hash values may provide a traceable history of changes made to data objects by partner systems.

When a data object is notarized by executing a transaction to store a root hash value in a blockchain node of a given blockchain network, proof of existence or proof-of-non-existence of the data object is provided. In some examples, the proof of existence may be interpreted as a proof of existence of versions of a given data object, for example, multiple versions of a document.

In some implementations, different versions of a data object may be notarized at the federated data management layer. The notarized versions of the data object correspond to different root hash values stored in the blockchain network and form a chain of hash values, each hash value corresponding to a different version of a data object. In some examples, two versions of a data object may be interpreted as two separate data objects that refer to a common data object model. The data object model may define one or more object properties and a metadata structure. Further, the data object model may be associated with predefined visibility levels corresponding to different views provided for a given data object. The root hash may be calculated for a given data object independently of any visibility levels. The visibility levels are relevant for defining a view of the data object to a relevant party, such as a partner system of the blockchain network. When a view of the data object is shared, which includes part of the data of the data object, a proof for the view may be generated. For example, a Merkle proof may be generated for the view. In some implementations, visibility levels may be defined and/or changed for a data object after the data object is notarized.

In some implementations, a root hash value may be generated according to a mapping structure defined for multiple visibility levels for a data object. When data for a data object is shared with a partner system associated with limited visibility, at least a portion of the data for the data object is shared with the partner system. For example, the data for the data object may be shared in response to a received data request from the partner system, or there may be a pre-configured setup of automatic exchange of data between a set of partner system without an explicit request. Even if partial data is shared, the receiving party may still verify that the received partial data is authentic in comparison with the original data as agreed and notarized. The partner system may receive the partial data and a hash proof for the authenticity of the partial data of the data object. Based on the hash proof and in response to evaluating the notarized root hash value, the receiving party may determine whether the received data is authentic or fraudulent. The hash proof provides a unique identification of the provided partial data for the data object corresponding to the limited visibility level. The hash proof may be used to precompute a root hash value that can be compared with the notarized root hash value as stored in the blockchain network. If the precomputed root hash value corresponds to the notarized root hash value, it may be determined that the received data for the data object is authentic and not tampered with.

To provide further context for implementations of the present disclosure, the blockchain network maintains a distributed ledger, referred to herein as a blockchain. The blockchain network may be made up of peer-to-peer nodes, and enables participating entities corresponding to partner systems to securely, and immutably conduct transactions and store data. Although the term blockchain is generally associated with crypto-currency networks, blockchain is used herein to generally refer to a distributed ledger without reference to any particular use case.

A blockchain is made up of a chain of blocks, each block storing data. Example data includes data representative of a data object created in relation to interactions between two or more participants. While data objects are used herein by way of non-limiting example, it is contemplated that any appropriate data can be stored in a blockchain (e.g., documents, images, videos, audio). The stored data in a blockchain may be hash values for documents, images, videos, audios, or other data object in general. The hash values may be stored by executing transactions at the blockchain network. The stored data represent data that is immutably stored within the blockchain. That is, the stored hash value data cannot be changed. Accordingly, a blockchain is a data structure that stores data in a way that the data is immutable and can be verified. Each block in the chain is linked to a previous block immediately before it in the chain by including a cryptographic hash of the previous block. A block also includes a timestamp, its own cryptographic hash, and data. Each block is provided based on one or more executed transactions.

In the context of the instant application, a transaction can be executed to store a hash value of a data object associated with a partner system of the blockchain network. For example, a transaction may be executed based on a change to an electronic document (e.g., a contract) to generate a new version and/or a new data object that is agreed to between two or more partner systems of the federated management system. To record the agreement, a root hash value may be stored in the blockchain network to serve as proof of existence and authenticity of the original authentic content of the version.

FIG. 1 depicts an example environment 100 that can be used to execute implementations of the present disclosure. In some examples, the example environment 100 enables users associated with respective systems (e.g., employees, data administrators, contractors, representatives) to manage (e.g., create, execute, close) data objects (e.g., contracts, business objects) between enterprises created by corresponding software system in a technology platform. The example environment 100 includes computing devices 102, 104, back-end systems 106, 108, a network 110, and a blockchain network 112 (e.g., consortium blockchain network). In some examples, the computing devices 102, 104 are used by respective users 114, 116 to log into and interact with the platforms and running applications according to implementations of the present disclosure.

In the depicted example, the computing devices 102, 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems (e.g., the back-end systems 106, 108). In some examples, the network 110 can be accessed over a wired and/or a wireless communications link. For example, mobile computing devices, such as smartphones can utilize a cellular network to access the network 110.

In the depicted example, the back-end systems 106, 108 each include at least one server system 120. In some examples, the at least one server system 120 hosts one or more computer-implemented services that users can interact with using computing devices. For example, components of enterprise systems and applications can be hosted on one or more of the back-end systems 106, 108. In some examples, a back-end system can be provided as an on premise system that is operated by an enterprise or a third party taking part in cross-platform interactions and data management. In some examples, a back-end system can be provided as an off-premise system (e.g., cloud or on-demand) that is operated by an enterprise or a third-party on behalf of an enterprise taking part in the federated management system.

In some examples, the computing devices 102, 104 each include a computer-executable applications executed thereon. In some examples, the computing devices 102, 104 each include a web browser application executed thereon, which can be used to display one or more web pages of platform running application. In some examples, each of the computing devices 102, 104 can display one or more GUIs that enable the respective users 114, 116 to interact with the computing platform.

In accordance with implementations of the present disclosure, a computing platform leverages the blockchain network 112 to facilitate data management, and to notarize data objects, such as record contracts, documents, and/or transactions between enterprises/platforms. In some implementations, the blockchain network 112 is provided by a third-party provider. In some examples, the blockchain network 112 is one of a permissionless blockchain network, and a permissioned blockchain network. In general, in a permissionless blockchain network, the identity of participants can be obfuscated (e.g., pseudonymous, anonymous), and anyone can participate, read all transactions, participate in the process of block verification to create consensus (described in further detail herein), and the like. In general, in a permissioned blockchain network, all participants are known, approved, and governed.

In general, and as introduced above, a blockchain is a ledger including records that have ever been executed in one or more contexts (e.g., a contract between multiple parties). Whereas a blockchain is a data structure for storing transactions, a blockchain network is a network of computing nodes that manage, update, and maintain one or more blockchains. A blockchain constantly grows as completed blocks are added with a new set of transactions. In some examples, a single block (or block node) is provided from one or more transactions. Blocks may be added to the blockchain in a linear, chronological order by one or more computing devices in a peer-to-peer network of interconnected computing devices that execute a consensus protocol. The peer-to-peer network can be described as a plurality of interconnected nodes, each node being a computing device that uses a client to validate and relay transactions (e.g., resource transfers, data object manipulations). Each node maintains a copy of the blockchain, which is automatically downloaded to the node upon joining the peer-to-peer network. A consensus protocol provides a secure and reliable method of updating the blockchain, copies of which are distributed across the peer-to-peer network, without the need for a central authority.

A blockchain network can be provided as a public blockchain network, a private blockchain network, or a consortium blockchain network. Multiple nodes within the blockchain network may participate in the consensus protocol and perform work to have a block added to the blockchain.

Because all users (e.g., participants in an agreement over a document) need to know all previous related data objects (e.g., contract creation, edits, signature, object versions) to validate a requested transaction to store a root hash value for a data object at the blockchain network, at least a portion of the participants (e.g., users, a majority of users working with application on partner systems) must agree on which data objects and/or versions have actually occurred, and in which order. That is, consensus must be reached. For example, if two users observe different data object histories, they will be unable to come to the same conclusion regarding the validity of a transaction. In some examples, all users agree on the same rules used to validate transactions (e.g., as provided in the blockchain protocol), thus coming to a consensus.

With continued reference to FIG. 1, the blockchain network 112 is provided as a peer-to-peer network including a plurality of nodes 130, at least some of which immutably record information in a blockchain 132 (distributed ledger). Although a single blockchain 132 is schematically depicted, multiple copies of the blockchain 132 are provided and maintained across the blockchain network 112. For example, multiple nodes 130 each store a copy of the blockchain 132. In some implementations, the blockchain 132 stores information including, without limitation, contracts, transactions, supporting documents, and the like.

In accordance with implementations of the present disclosure, and as described in detail herein, each enterprise participating in a federated data management network platform operates one or more nodes 132 within the blockchain network 112.

As introduced above, implementations of the present disclosure can be realized using the example blockchain network (e.g., distributed ledger platform) 112 that provides storage of notarized hash roots of data objects created in relation to systems from multiple partner system associated with the blockchain network.

According to implementations of the present disclosure, a federated data management layer is provided for notarization of data objects at the blockchain network 112. The notarization may be performed by executing transactions to store root hash values generated for data objects at the blockchain network 112. Such stored root hash values are light-weight data entities that corresponds to the original content of the data objects and may be used for verifying authenticity of exchanged communication related to the data objects between partner systems of the blockchain network 112.

In some examples, stored notarized root hash values at blockchain nodes may not be globally visible to all participants in the blockchain network 112. For example, it can occur that an object only involves a sub-group of participants, i.e. a set of partner system, for which visibility to the object is limited. In yet another example, all notarized root hash values may be globally visible to all partner systems of the blockchain network. In such scenarios, visibility of exchanged data may be defined based on defined visibility levels for data objects and encoding the defined levels into computed root hash values based on generated hash structure. A map may be defined for the data objects to outline the one or more visibility levels associated with key-value pair objects. The map may be transformed into hash values to generate the hash structure for the data object. The key-value pairs objects include properties and corresponding property values of the data objects.

In accordance with implementations of the present disclosure, and as noted above, the back-end systems 106, 108 may host enterprise applications or systems that require data sharing and data privacy. The blockchain network 112 may be defined as a central component for facilitating data management and communication between partner systems.

In accordance with implementations of the present disclosure, the blockchain nodes and the blockchain network may be used for storing hash values of data objects that are generated during operations between respective entities associated with partner systems for the blockchain network. In this manner, only hash values are stored in the blockchain and data for data objects may be exchanged using a communication protocol. For example, peer-to-peer messaging service protocol may be configured directly between the partner systems. The stored hash values at the blockchain network provide a light-weight solution for data verification during data exchange. Further, evaluation of hash values is performed faster as fewer computing resources are required.

As introduced above, implementations of the present disclosure are directed to providing a framework that reduces the number of operations and evaluations that are performed when setting up a consortium or an agreement between partner systems of a blockchain network, such as the blockchain network 112 at FIG. 1. The framework may provide technical capabilities and facilitate collaboration between systems during exchange of data and communication created data objects, such as business objects, during operations of partner systems applications.

Figure 2:
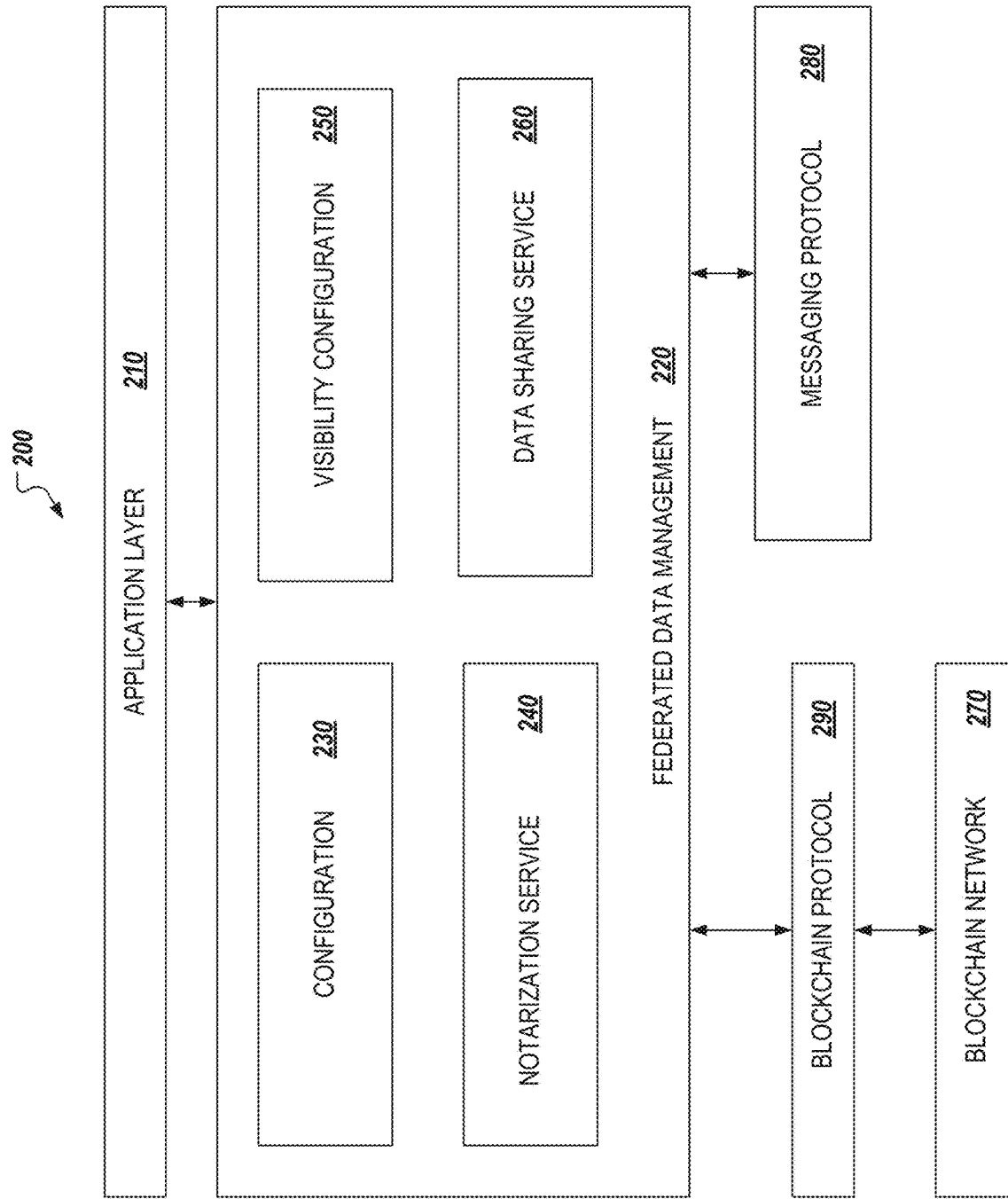
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a federated data management layer 220 between an application layer 210 and a blockchain network 270 including blockchain nodes. The example conceptual architecture 200 also includes a messaging protocol 280. The federated data management layer 220 is provided to facilitate data sharing between applications by notarization of data objects. When notarizing a data object, a transaction is executed to store a root hash value for the data object in a blockchain of the blockchain network 270 through a blockchain protocol 290. Blockchain protocols provide features that enable storing of hash values for a data object in the blockchain network 270. For example, blockchain protocols that may be implemented are such as off-chain-streams in Multichain, private side-DBs in Hyperledger Fabric, etc.

In some implementations, the blockchain network 270 may be associated with multiple partner systems, including a system running the application layer 210. The application layer 210 may be an application layer of a customer relations management (CRM) application running on an infrastructure platform, such as a cloud infrastructure platform. The application layer 210 may communicate multiple data objects with another application of a partner system of the blockchain network 270 through the federated data management layer 220. The two applications may exchange information for different versions of a data object, for example, a contract agreement, using the messaging protocol 280.

In some examples, the messaging protocol 280 may transfer data between participants represented by partner systems of the blockchain network 270. The exact format of the data to be exchanged is agreed upon between the participants of a communication.

When two applications agree on a data object, they may notarize the data object and store a root hash node for the data object at a node. Content of a data object is agreed between the systems and/or user of the systems, and root hashes are stored in the blockchain as proof-of-existence and content. When a partner system of the blockchain network 270 receives information about the data object, the partner system may determine whether received data for the data object is authentic by verification performed based on the stored root hash node. Participants may exchange hash proofs to provide additional information about shared data for data objects when exchanging data for data objects. Such hash proofs may be used to determine authenticity of received data. The hash proofs may be evaluated in relation to notarized root hash values for the data object.

In accordance with implementations of the present disclosure, the federated data management layer 220 facilitates interaction between applications. In some examples, the applications may be of a common technology or of different technologies, for example, with different hardware and/or configuration requirements. In some implementations, applications interact during different scenarios that may share a common task for exchanging data according to implemented logic. The federated data management layer 220 may support exchange of data between application by implementing services that are consumed by the business logic of the application layer 210. The example conceptual architecture 200 provides services at the federated data management layer 220 that are consumed by related applications built thereon. The application layer 210 consumes services provided by the federated data management layer 220 to interact with other applications running on partner systems to the blockchain network 270.

In accordance with implementations of the present disclosure, the application layer 210 may include implemented logic of an application associated with the blockchain network 270. The example architecture 200 may support exchange of messages between the application and other partner systems/applications in a peer-to-peer broker-less fashion. Further, notarization of data objects requested using the application layer 210 may be performed based on the federated data management layer 220. Such data objects may be generated in relation to communications and interactions between the application and another application running on a partner system to the blockchain network 270. For example, the other system may include an application layer corresponding logically to the application layer 210, which communicates with the blockchain network 270 through a federated data management layer 220 initialized for the other application. Thus, federated data management layers instantiated for applications associated with partner systems of the blockchain network facilitate the communication and data sharing of data for data objects that are notarized.

The federated data management layer 220 provides services implemented through the included components. In the example of FIG. 2, example components include a configuration component 230, visibility configuration component 250, a notarization service 240, and a data sharing service 260. The federated data management layer 220 may utilize different communication protocols when implementing the notarization service 240, the data sharing service 260, and the like.

Notarizing an object may include a subset of communications between a partner system of the blockchain network 270, and more particularly by an application running on the partner system, and a federated data management layer 220 to achieve an agreement on a state of the object. For example, the application layer 210 communicates with the blockchain network 270 through the federated data management layer 220 to notarize a root hash node of a first data object as proof of existence and authenticity of content of the first data object.

Further, the federated data management layer 220 may facilitate event tracking and notification through storing events and managing communication of event handlers. The federated data management layer 220 may interface with logic implemented at the application layer 210 of the application of a partner system of the blockchain network 270.

In accordance with implementations of the present disclosure, the example architecture 200 supports interoperability between applications of different implementations and technological characteristics. A pluggable notarization architecture is provided to facilitate data sharing and verification through the blockchain network 270. Such an architecture may be independent from a type of the blockchain protocol 290 that is used. Data object may be notarized and shared through an established federated data management layer 220 for communication between an application layer 210, the blockchain network 270, and other partner systems of the blockchain network 270.

In accordance with implementations of the present disclosure, the configuration component 230 manages configuring and storing of configuration data for the application layer 210. The configuration data is related to the partner system associated with running the application layer 210. For example, the partner system may be associated with running multiple applications where multiple application layers are provided. The configuration component 230 enables coordination and maintenance of interactions between applications through the application layer 210 and the federated data management layer 220 with other the partner systems and the blockchain network 270. The configuration component 230 specifies details for the blockchain network 270 as a consortium network for interaction between a predefined set of partner system. The configuration component 230 includes communication details defining mappings of identities of enterprises associated with partner systems of the blockchain network 270. Further, the configuration component 230 maintains privacy protection details such as public keys and peer-to-peer addresses of associated partner systems and applications to the application layer 210.

In accordance with implementations of the present disclosure, the notarization service 240 provided by the federated data management layer 220 is instantiated to notarize data objects to a predefined and configured blockchain network, such as the blockchain network 270. The federated data management layer 220 provides the notarization service 240 to enable writing of a hash value for a data object at a blockchain node of the blockchain network 270. The writing of the hash value may be performed through executing a transaction through the blockchain protocol 290 of the blockchain network 270. In some implementations, the data objects can include events, documents, objects, transaction agreements, or generic objects that are stored in the blockchain network 270.

When a root hash value for a data object is notarized, a transaction that is executed in the blockchain network 270 may be defined to include as an input to another notarized root hash value, i.e., to consume an existing notarization. As new notarizations may consume existing notarizations, a chain of versions of a data object can be established. Additionally, as a user of a partner system can check whether a particular version of a data object has already been consumed, a shared consensus on the current version of a data object is provided.

Data sharing and data privacy are core concepts of interactions between enterprises that are performed through computing systems and applications. As noted above, a data object may have a basic data structure and may be exchanged between partner systems of the blockchain network 270. The data sharing service 260 is implemented at the federated data management layer 220 to facilitate sharing of data for data objects between applications using the messaging protocol 280.

In some implementations, the data object that is notarized and is to be shared with partner systems may be defined to include multiple visibility levels. In such manner, a first set of properties and corresponding values for these properties of the data object may be identified to correspond to one visibility level, and other sets of properties may be associated to correspond to other visibility levels. For example, if only two levels are defined, all of the properties with property values may be associated with a first visibility level, and a limited set of properties may be associated with a second visibility level. Further, it may be possible that key-value pairs are defined to correspond to visibility levels, as more than one key-value pair may be associated with one property, but the two key-value pairs may be associated with different visibility levels.

To provide light-weight data sharing and verification of authenticity, a hash proof may be computed and used to provide proof of inclusion and data integrity of a data object. A hash structure may be defined for the data object that may be a Merkle hash tree structure. The hash tree may be constructed to include nodes of hash values. The hash tree structure may include multiple tree levels, where a hash at an upper tree level may be constructed by hashing concatenations of hash values at lower tree nodes together to ultimately provide a root hash at the root level. The hash tree may be defined to provide different groups of leaf nodes to provide a map of different visibility levels defined for the object. The root hash value of the hash tree is an identifier of the data object and is used for signing and verification of data integrity. Every change in a data object on a leaf level will change the root hash. An example hash tree is described in further detail with reference to FIG. 4.

Further, the federated data management layer 220 may include an event service to monitor the blockchain network for any changes, for example, in relation to newly notarized data objects. The event service may provide monitoring using a polling or an event mechanism in order to obtain new notarizations.

Figure 3:
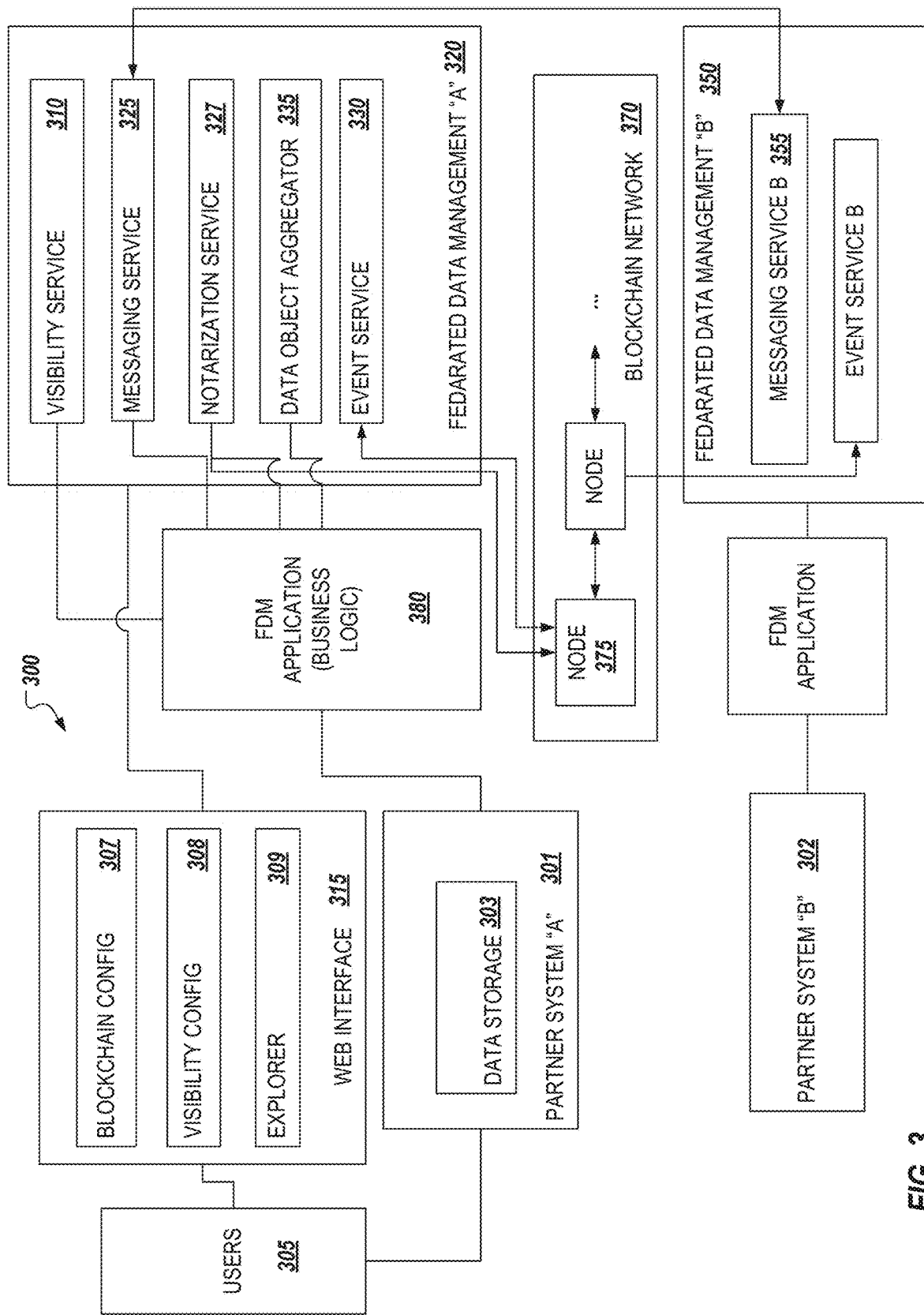
FIG. 3 depicts an example computer architecture implemented to manage data exchange through a notarization and a visibility services provided by a federated data management layer in accordance with implementations of the present disclosure.

FIG. 3 depicts an example computer architecture 300 implemented to manage data exchange through a notarization and a visibility services provided by a federated data management layer in accordance with implementations of the present disclosure. The federated data management layer may be such as the federated data management layer 220 as described above with reference to FIG. 2.

In some implementations, federated data management layers may be implemented for partner systems of a blockchain network 370 and are configured to communicate and verify data through the blockchain network 370.

The blockchain network 370 may be such as the blockchain networks discussed above with reference to FIG. 1 and FIG. 2. The blockchain network 370 may be used for notarization of root hash values computed for data objects. The data objects are related to interactions between systems from the partner systems of the blockchain network 370. The blockchain network 370 includes nodes, such as a node 375, where root hash values for notarized data objects are stored.

In accordance with implementations of the present disclosure, a federated data management "A" layer 320 is provided that is implemented in a microservice architecture to enable cross-enterprise data sharing based on notarization of root hash values of data objects. The federated data management "A" layer 320 is implemented in relation to a partner system "A" 301. The federated data management "A" layer 320 communicates with the underlying blockchain network 370 through a blockchain protocol service that is independent from the blockchain technology used by the blockchain network 370.

The partner system "A" 301 may be a computing system running software applications such as a supply chain management (SCM) application. The partner system "A" 301 includes a data storage 303, where data including data for created data objects may be stored.

In accordance with implementations of the present disclosure, users 305 may configure and manage the federated data management "A" layer 320 for partner system "A" 301 through a web interface 315. The web interface 315 provides a blockchain configuration unit 307 to configure the partner system "A" 301 to interact with the blockchain network 370. Further, users 305 may define a visibility configuration 308 for data objects created by the partner system "A" 301 when shared with other partner systems for the blockchain network 370. For example, the visibility configuration 308 may include visibility rules configured to define minimum set of properties of data objects of a given data object model for direct and indirect sharing with a partner system. Different visibility rules may be associated with different partner systems. The web interface 315 includes an explorer component 309 to provide overview of current state of configuration of partner system "A" 301 for interaction with partner systems of the blockchain network, configuration details, mappings of entities to partner systems, and the like.

In accordance with implementations of the present disclosure, the partner system "A" 301 communicates through the federated data management "A" layer 320 with the blockchain network 370 to notarize data objects that are related to interactions with other partner systems of the blockchain network 370. Users 305 may interact with the partner system "A" 301 to notarize data objects through a federated data management (FDM) application 380 that is communicatively coupled to the federated data management "A" layer 320.

The FDM application 380 implements logic corresponding to the logic of the partner system "A" 301 and may transfer requests for notarization of data objects from the partner system "A" 301 to the federated data management "A" layer 320. The FDM application 380 understands the notarization process and the manner of defining and storing data objects at the partner system "A" 301. The FDM application 380 may be specific to the technology and implementation of the partner system "A" 301.

In some implementations, when a change in relation to a data object is performed at the partner system "A" 301, a notification may be sent to the FDM application 380 regarding the occurred change. The change may be such as creation of a new data object, or editing of an already created document. For example, partner system "A" 301 may interact with partner system "B" 302 to generate a data object including key-value pairs agreed upon by the two parties. The FDM application 380 may communicate with the federated data management "A" layer 320 in relation to sending requests for notarizing a root hash value for the data object. The communicated data object may include key-value pair objects corresponding to object properties (attributes).

The partner system "A" 301 may request to notarize a root hash value for the data object at the blockchain network 370 as proof of existence and authenticity of the data object. When interactions between partner systems concerning the data object and data of that data object are performed, a partner system may be able to verify whether received data for that data object corresponds to the original content of the data object and/or that it is not the original content and can be a fraudulent version.

In some implementations, partner system "A" 301 and partner system "B" 302 are instantiated with federated data management layers—the federated data management "A" layer 320 and a federated data management "B" layer 350, to interact, notarize, and verify content of data objects that are notarized. The federated data management "A" layer 320 and federated data management "B" layer 350 may have corresponding implementations and provide common services and functionality. The federated data management "A" layer 320 and the federated data management "B" layer 350 may be such as the federated data management layer described herein with reference to FIG. 1 and FIG. 2.

In some implementations, the federated data management "A" layer 320 provides a notarization service 327. The notarization service 327 may be such as the notarization service 240 and is implemented to execute transactions at the blockchain network 370 through a blockchain protocol. Notarization can be described as a process of registering the existence of an object on the blockchain so that any (permissioned) observer can see and verify it. In accordance with implementations of the present disclosure, notarization is performed to a root hash value of a data object as opposed to the entire content of the data object. In this manner, the notarized hash value is stored in the blockchain network and becomes visible to the partner system.

To be able to notarize a data object according to implementations of the present disclosure, a hash structure may be generated for the data object. The hash structure defined for a data object may be a Merkle hash tree structure. The hash structure may be organized to correspond to defined visibility levels for the data object in relation to other partner systems to the blockchain network 370. The hash structure that is defined for a data object may be such as the discussed below structure of a Merkle hash tree for an example data object in relation to FIG. 4.

In some implementations, the hash tree may be defined to include mappings of one or more properties of a data object to a visibility level of the data object. The data object may be defined as associated with a number of visibility levels. For example, a data object may be defined as a material provided by a supply company to a customer. The data object including these key-value pairs may be represented in different data formats, such as JSON, XML, and the like. Whenever a supply chain material is created at an enterprise, a data record is stored in a supply chain application. For the created data record that identifies a data object corresponding to the material, object properties are defined. These properties are formatted as a key-value pair objects where all the values may be defined as plain text, i.e. no object as value is permitted. In case of having an object as a value, the inner key and outer key can be concatenated using a delimiter (e.g. dot ".") thus the value remains as a plain text.

Table 1 below represents a data object defined with a set of properties associated with key-value pairs. Table 2 below represents another data object defined with key-value pair objects that are formatted as plain text.

TABLE 1

```
{
"contact":
    {
       "email": "one@mail.com",
       "name": "Peter"
    }
}
```

TABLE 2

```
{
   "contact.email": "one@mail.com",
   "contact.phone": "012345"
}
```

In some implementations, a data object, such as those presented as examples at Table 1 and/or Table 2, may be transformed to a Merkle tree and a root hash value of the Merkle tree may be saved on a ledger in the blockchain network. For the above example of Table 2, the Merkle Tree contains three leaf nodes, which include "contact.email, contact.phone", "one@mail.com" and "012345".

The partner system "A" 301 may send a request to notarize a data object at the blockchain network. For example, the request may be for a data object such as the example object presented above in Table 1 or Table 2. A hash structure such as a Merkle tree hash structure may be generated for the data object and a root hash value may be computed. Such a root hash value is notarized. In some implementations, the root hash value may be notarized together with information about the owner of the data object.

The notarization service 327 may provide previously stored root hash nodes as transaction input for already notarized data objects in the blockchain network 370. Further the notarization service 327 may provide an owner of the hash value as input. The owner of the hash value may be associated with the partner system "A" 301 that requested notarization of the corresponding data object. The owner of the hash value may be provided with writing and/or editing capabilities for the hash value. A system that is not defined as an owner of the hash value may not consume, or edit the hash value. Such a non-owner may have read capabilities for the stored hash value. In some implementations, an owner of a hash value may consume the stored hash value and provide a signature to replace it with a new hash value for a newer version of the associated data object.

Based on the provided notarization of a data object by storing a root hash value computed for a hash structure that is defined based on predetermined visibility levels for the data object, data visibility may be configured not only on object level but also on attribute/property level.

The federated data management "A" layer 320 includes a visibility service 310 that is responsible for maintaining and providing configured visibility rules, such as the configured rules at the visibility configuration 308. An example hash structure including visibility levels configured based on visibility rules for properties of a data object is presented below with reference to FIG. 4.

When a document is shared in a specific context in a real use-case of interaction between enterprise systems, it is usually desirable to control sharing of sub-sets of attributes of the document to different parties. These subsets are usually not a partition of the set of attributes. The subsets of attributes of the document may be overlapping in the views of the different parties. Controlling visibility of data on different levels may be performed centrally, without creating multiple instances of an object to correspond to different targeted receivers. The blockchain network 370 is provided to store root hash value generated for data objects that are associated with partner systems of the blockchain network 370.

For example, parties associated with a creation of a document, such as a contract, purchase order, and the like, can verify that each party is working with the same version of the document that is most recent. Verification of document authenticity may be performed based on provided hash proof from a sharing party by using a correspondingly instantiated federated data management layer. The parties represented by corresponding systems can interact with a version of the document, and record a transaction for the document version within the blockchain network to create an immutable audit trail. In some examples, and as described in further detail herein, immutability is provided by capturing and recording unique hash values corresponding to documents, and/or objects on the blockchain network. For example, a hash code is unique to a contract, and can be used to identify one contract from another within the partner systems of the blockchain network. In some examples, each version of a contract has a unique hash code, as each version includes different content.

According to implementations of the present disclosure, in addition to exchange of notarizations on the blockchain layer, all other information, including content of notarized data objects, may be exchanged on a peer-to-peer basis by the messaging services implemented at the federated data management layer, such as the messaging service 325 at the federated data management "A" layer 320 and the messaging service B 355 at the federated data management "B" layer 350. Partner systems of the blockchain network may exchange data through a peer-to-peer exchange protocols directly and not using the blockchain network 370. To enable this communication, an implementation of a broker-less peer-to-peer messaging service may be provided. The broker-less peer-to-peer-messaging service may be based on the ZeroM Q library with optional encryption. A broker-less architecture of communication between federated data management layers instantiated for partner systems may provide high throughput and enable potentially sensitive data to be transferred without going through an intermediary, to provide increased security.

The federated data management "A" layer 320 includes an event service 330 and a data object aggregator 335 service. The event service 330 is configured to register systems for notifications of events associated with a given node/data object at the blockchain network. A systems may be configured through the event service 330 to listen to all events coming from the blockchain network 370 in relation to event subscriptions. The event service 330 communicates relevant events to the data object aggregator 335 service. The data object aggregator 335 receives messages from other services at the federated data management "A" layer 320, such as the event service 330, the notarization service, the visibility service, etc. The data object aggregator 335 stores received events and messages in order to maintain a complete view of the available data to the partner system "A" 301. Such data may then provide to the logic implemented at the FDM application 380 for further interaction, evaluations, and the like.

Figure 4:
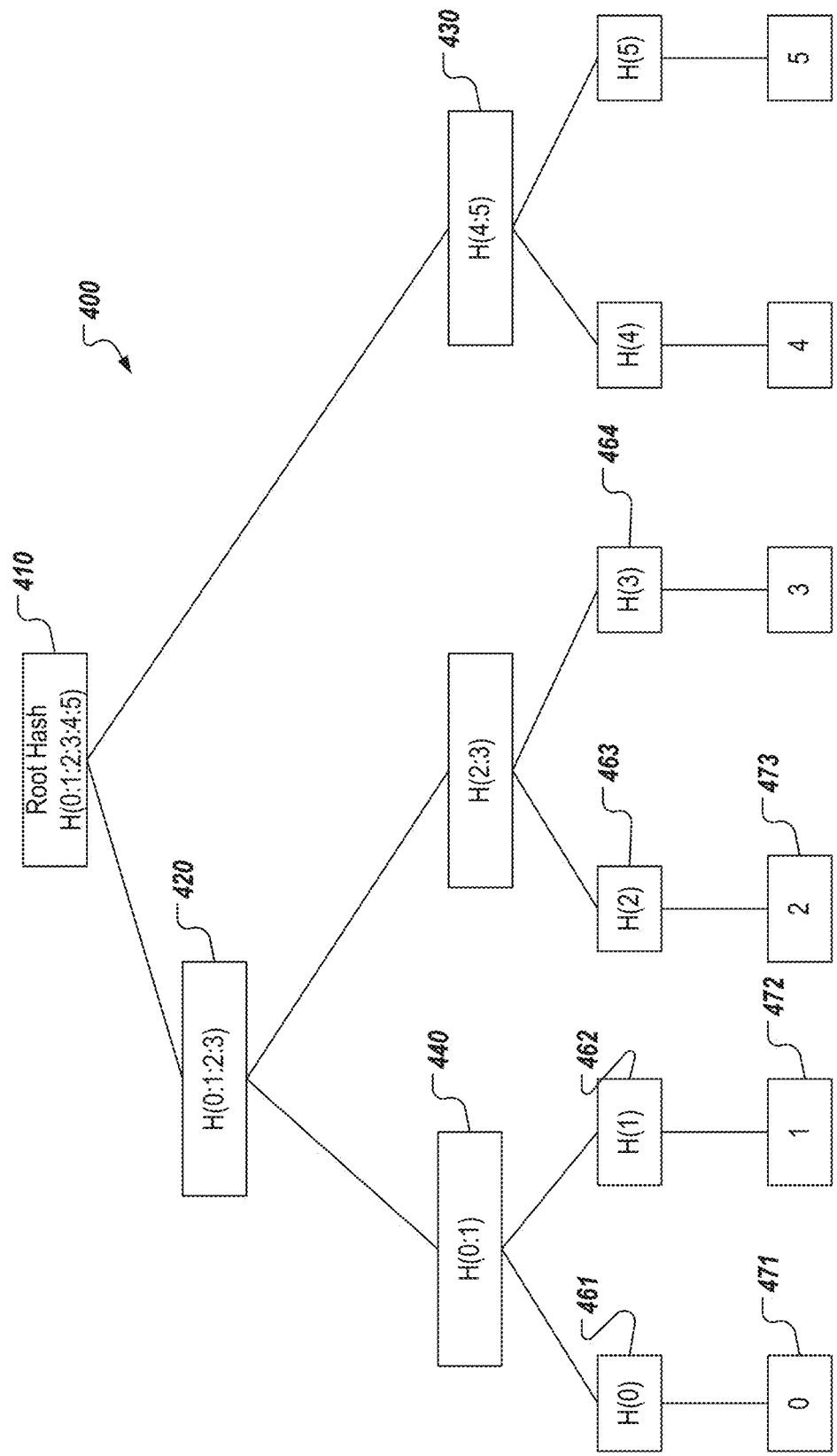
FIG. 4 depicts an example tree data structure in accordance with implementations of the present disclosure.

FIG. 4 depicts an example tree data structure 400 in accordance with implementations of the present disclosure. The example tree data structure may be a hash structure generated for a data object as described herein with reference to FIG. 1, FIG. 2, and FIG. 3. The data object may be notarized by using a notarization service provided by a federated data management layer according to implementations of the present disclosure. When notarized, the hash structure may be generated and a root hash value 410 of the example tree data structure 400 may be stored in a blockchain network as discussed with reference to FIG. 1, FIG. 2, and FIG. 3. Notarization may be performed based on a notarization service provided by a federated data management layer, such as the federated data management layer 220 at FIG. 2, the federated data management "A" layer 320 at FIG. 3. The notarization service may be such as the notarization service described herein with reference to FIG. 2 and FIG. 3.

The data objects, which have been verified by nodes of the blockchain network are hashed and encoded into a hash tree. The hash tree can include, for example, a Merkle tree, or a Merkle-Patricia tree (MPT). Key-value pairs defined for properties of the data object are hashed. Hashing can be described as a process of transforming the key-value pairs stored for properties of a data objects (e.g., provided as string data) into a fixed-length hash value (e.g., provided as string data). It is not possible to un-hash a hash value at the tree structure to obtain the key-value pair data corresponding to a tree node. Hashing ensures that even a slight change in the stored data results in a completely different hash value. Further, the hash value may be of a fixed length. That is, no matter the size of data within a key-value pair, the length of the hash value is fixed. Hashing may include processing a key-value pair of a property of the data object through a hash function to generate the hash value. An example hash function includes, without limitations, the secure hash algorithm (SHA)-256, which outputs 256-bit hash values.

A hash tree is a data structure in which data at the leaf nodes of the tree is hashed, and all hashes in each branch of the tree are concatenated at the root of the branch. This process continues up the tree to the root of the entire tree, which stores a hash that is representative of all data in the tree. This hash value is referred to as the root hash (Merkle root hash). The definition of the hash structure may corresponds to definition of visibility rules for the data object.

In some implementations, a hash tree may have a predefined hierarchy configured for the data object. For example, a hash tree may have the representation of the example hash tree structure 400 of FIG. 4 discussed below. The hash tree structure 400 may be depicted as a map in accordance with implementations of the present disclosure. A hash tree map may associate tree nodes that represent computed hash values. For example, a first lower layer of a hash tree structure may correspond to computed hash values for defined key-value pairs corresponding to properties of a data object. The leaf nodes as defined at the first lower layer may be concatenated to compute a hash value at an upper level of the hash tree structure 400. In some examples, a hash value, such as hash 440 changes as a result of any changes to the underlying hashes. Therefore, if a data object is updated to define new property values, a resultant hash root computed for that updated data object is different from the previously computed one.

In some examples, a party A owns a document and needs to share a subset of the document's attributes with a party B, as well as a different subset of attributes with a party C. These two sets of properties may overlap. Therefore, different views of data for the document may be generated to correspond to the party B and to the party C. One common approach to this scenario is to create two different copies of the document with the required attributes and share them separately with the corresponding parties. This means that separate copies are to be kept in a system and the two different objects (different views corresponding to different visibility rules) may be notarized by storing root hash value of a hash structure generated for these two different object. The root hash values would be different as the content of these object, though overlapping is in general different. Later on, if party B and/or party C needs to share some parts of their received copies, they need to repeat the same process again. Therefore, by defining a hash structure that corresponds to predefined visibility levels for a data object, a map of key-value pairs of a data object may be created and encoded into a single root hash value that can be notarized. Such a single root hash value that encodes multiple visibility rules can be used to verify authenticity of multiple generated views corresponding to different visibility levels. Such verification can be performed through one root hash value stored in a blockchain network rather than multiple values.

According to implementations of the present disclosure, a data object may be transformed into a map of key-value pairs, which map can then be further converted into a Merkle tree structure. Hash tree structure 400 is an example Merkle hash structure that encodes two visibility levels. The hash tree structure 400 may be generated for a data object such as the object presented below in Table 3. Table 3 represents a data object defined with key-value pairs corresponding to properties defined in hierarchical levels. The data object may be a material item that is defined as a data object according to a data object model including properties such as material identification number, material type, and material details including creation data, expiration date, and location. The data object includes key-value pairs corresponding to the properties that define values per properties.

TABLE 3

{
"type": "MaterialItem",

TABLE 3-continued

```
"details": {
   "MaterialId": "80424001",
   "MaterialName": "Intraferol",
   "ExpiryDate": "2018-11-05",
   "Quantity": "16000"
   "Unit": "PCE" }
}
```

For example, a first lower leaf level of the tree structure 400 defines values of the properties of the data object. Block 471 is an identification number for the type of the material. Block 472 corresponds to 80424001, which is the material identification number as outlined in Table 3. Block 473 corresponds to Intraferol, which is the material name, and so forth.

In some implementations, a data object, such as the data object presented above in Table 3 and presented with the hash structure 400, may be defined in relation to visibility levels. A set of visibility levels may be defined for properties of a given data object. For example, different sets of data for properties of a given data object may be shared. A first visibility level may be defined to include all of the key-value pair objects of the data object. Such visibility level may be configured to be associated with providing full detail disclosure of the information for the data object. For example, when multiple parties interact, one may reveal all of the data for a given data object with an accounting party for legal purposes. However, a restricted set of the pair data objects may be shared with a supplier, and a different set of pair data objects may be shared with a customer. The definition of visibility levels based on properties of a data object provides great flexibility and configurability for sharing data. The visibility levels may be defined in relation to platform systems and applications considerations, or may be configured according to configuration specification for exchange of information according to particular predefined data models between systems and applications.

The property values as defined at the lower level of hash tree structure 400, may be concatenated and processed through a hash function to provide subsequent hash values and a root hash value 410. The root hash value 410 is a hash value associated with all property key-value pairs underlying the data object. The root hash value 410 is bound to the defined mapping of sets of properties within the hash tree structure 400. For example, hash values 461, 462, 463, and 464 are concatenated as they are mapped to one visibility level. Even a slight change in the key-value pairs results in a completely different hash value being generated. In some implementations, particular data may not be included in the hash value calculations. Consequently, any changes in the particular data does not result in corresponding changes in any of the hash values.

When a data object is notarized, that root hash may be stored in a blockchain node through executing a transaction at the blockchain network. The stored root hash in a blockchain node is representative of the data object and may be used to verify authenticity of a received data that is referred to as the authentic data object. A change in any of the hashed value pairs for the data object will result in change in its hash value, and ultimately, a change in the Merkle root hash. A hash purporting to be of a data object stored in the tree can be quickly verified by determining whether the hash is consistent with the structure of the hash tree.

The hash structure 400 is defined for a material data object defined at a supply chain application that is defined with two visibility levels. A first visibility level includes a restricted set of properties from all of the properties, and a second visibility level to correspond to a visibility level revealing data for all of the properties. The first visibility level includes properties-type, MaterialId, MaterialName, and ExpiryDate. These properties are concatenated into one branch of calculated hashes. First, each of these property key-value pairs are calculated to a hash value, respectively, H(0) 461, H(1) 462, H(2) 463, H(3) 464, and later on concatenated in pairs and at the upper end of the branch concatenated into one hash value—H(0:1:2:3) 420. For the two properties that are not to be shared when providing the first visibility level, namely the quantity and unit properties and their corresponding values, hash values are computed correspondingly, and they are concatenated into a common hash value—H(4:5) 430. A root hash value is calculated for this hash tree, which is H(0:1:2:3:4:5) 410. The root hash value 410 is computed to encode the defined visibility levels.

In the example hash tree structure 400, the first four of the properties (0 to 3) are mapped to a public visibility level including a minimum sharable data for a data object, where the latest two properties (4 and 5), i.e. private properties, are with limited visibility to a limited set of partner systems to the blockchain network. In such manner, the hash structure is defined to correspond to two visibility levels—public (data for the first four properties), and private (all data for the data object is provided for only a limited number of partner systems).

According to the example 400, the data object is transformed into a map of key-value-pairs. The map defines that first 4 properties are mapped to a public visibility level, and latest 2 properties are mapped to a restricted visibility rule. Such map may be transformed into a Merkle hash tree structure, where the computed root hash 410 is notarizable according to implementations of the present disclosure. When a certain subset of properties of the data object is shared, a Merkle proof is shared along with the shared subset of properties values corresponding to a determined visibility level associated with the sharing. The Merkle proof represents a minimum set of hashes from the Merkle tree to recalculate a root hash that when compared to the root hash 410 may result in determining that the shared data for the data object is authentic and agreed by the partner system. If the recalculated Merkle root hash when using a provided Merkle proof results in a different value than the root hash that is stored in the blockchain network, it may be determined that the received data is not authentic and does not corresponds to the agreed upon content of the data object.

In some implementations, a receiving party can independently reconstruct the Merkle tree. If the receiving party verifies the calculated root hash is already notarized, they can trust the received data and independently confirm the history of the data object and whether the data object is the most recent version. Storing a root hash node rather than data content of the corresponding data object reduced the data footprint at the blockchain network and enables the receiving parties to re-share what they have received in a different view suing the same notarization root hash.

Figure 5:
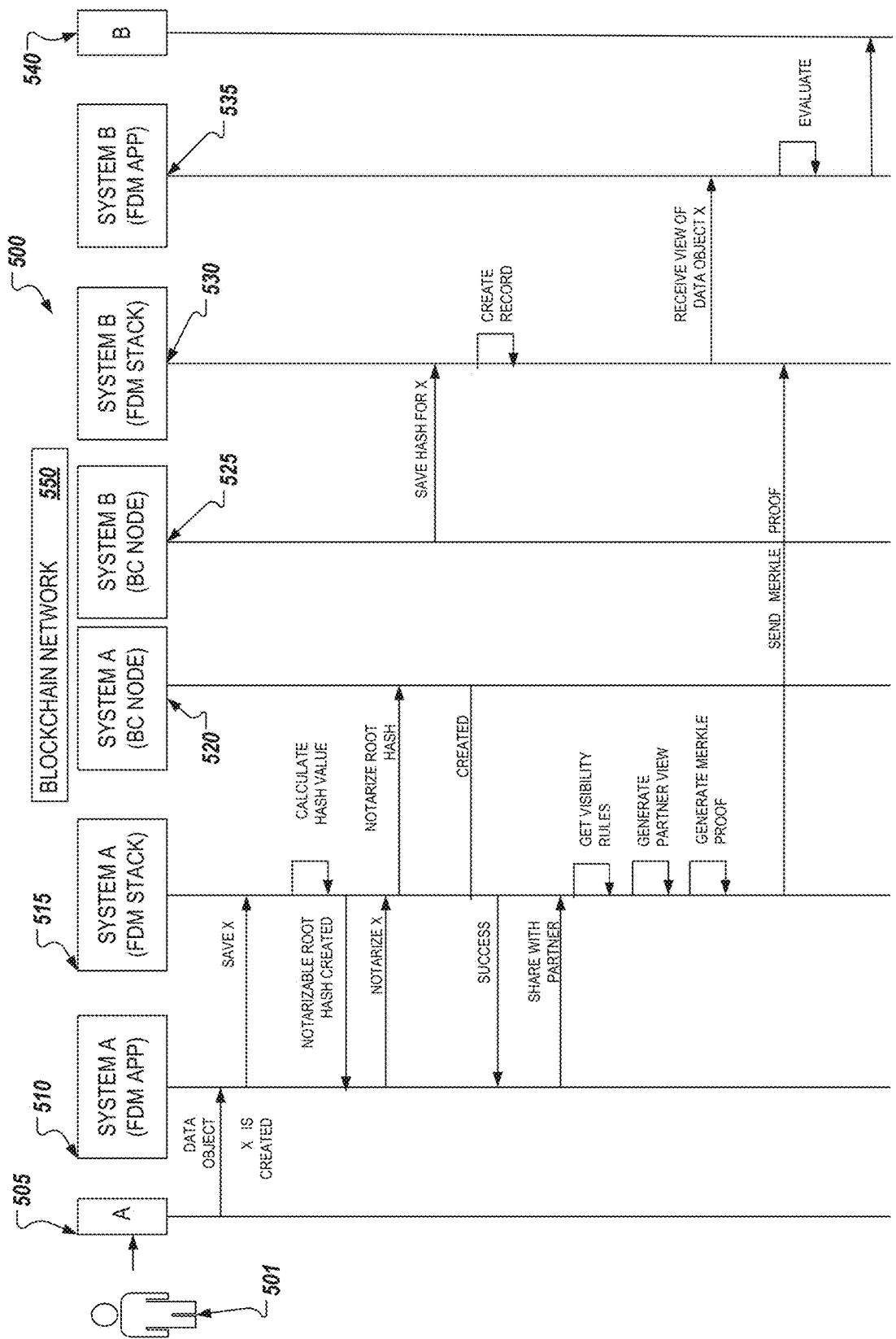
FIG. 5 depicts an example flow for federated data management in accordance with implementations of the present disclosure.

FIG. 5 depicts an example flow 500 for federated data management in accordance with implementations of the present disclosure.

According to the example flow 500, a user may interact with a system A 505. The system A 505 may be an ERP system running on an on premise platform, or may be a customer relationship management application running in cloud environment. The system A 505 may be a partner system defined for communication with other systems through a blockchain network in relation to notarization of root hash values for generated data object. The system A 505 may be such as partner system "A" 301, FIG. 3. The system A 505 may be configured to communicate with the blockchain network 550 through a instantiated federated data management layer, such as the federated data management layers describes herein with reference to FIGS. 1 to 4. The blockchain network 550 may be such as the discussed blockchain networks in the present disclosure.

The system A 505 may be configured to notarize data objects through a federated data management application—System A (FDM APP) 510 to a federated data management layer—System A (FDM STACK) 515. The system A(FDM STACK) 515 may correspond to the federated data management "A" layer 320 at FIG. 3. Such layer may be provided to all participant systems defined for the blockchain network 550.

Further, a system B 540 is provides as a partner system for the blockchain network 550. The system B 540 is provided with a system B (FDM APP) 535 corresponding to the functionality of the system A (FDM APP) 510. The system B 540 is provided with a system B (FDM STACK) 530 corresponding to the functionality of the system A (FDM STACK) 515.

The blockchain network 550 includes multiple nodes, where a node corresponds to a partner system. For example, the blockchain network 550 includes system A (BC NODE) 520 to correspond to system A 505 and system B (BC NODE) 525 to correspond to system B 540.

When a data object is created at the system A 505, for example, by the user 501, the system A 505 sends data of the data object to a system A (FDM APP) 515. The data object may be a material item, such as the discussed example with reference to FIG. 4. The material item object may be defined at system A 505 in relation to another partner system, and root hash value of the data object may be notarized as proof of existence, history, and authenticity.

The example flow 500 is provided to illustrate communication between partner systems of the blockchain network 550 where visibility of data for data objects that are notarized is managed through the implemented federated data management layers and the provided FDM applications. The configuration of the example flow 500 may corresponds to the flow described herein in relation to FIG. 3.

System A 505 provides data for data object X to the system A (FDM APP) 510. For example, the data that is provided for data object X is such as the data presented at Table 4 below.

TABLE 4

```
{
  "type": "MaterialItem",
  "consortiumMemberId": "Bayer",
  "details":
  {
    "MaterialId": "2080240",
    "BatchId": "3274831",
    "MaterialName": "Internal product"
    "Quantity": "500",
    "Unit": "PCE"
  }
}
```

When system A (FDM APP) 510 receives the data object, for example, as defined in Table 4, the FDM APP 510 saves the data object including data object key-value pairs in the FDM STACK 515. At the FDM STACK 515, a hash value is calculated for the data object. The hash value may be a root hash value of a hash structure defined for the data object. For example, the hash structure may be a Merkle tree hash structure, and the hash value may be a Merkle root hash value. Further, the data object may be associated with different visibility levels defined for different partner system. For example, properties such as type, consortiumMemberId and details.BatchID may be defined to correspond to a public visibility level, and properties such as details.MaterialID, details.MaterialName, details.Quantity, and details.Unit may be defined as private properties associated with a private visibility level. Some partner systems may be associated with a public visibility level, meaning that they may get access only to the public properties as defined. Other partner system may be associated with a private visibility level, which means that they may get access to all of the properties and properties values defined for the data object in the example. In may be appreciated that these two levels of visibility are only examples and different level of visibility may be defined, mapped and transformed into a hash structure, such as Merkle hash tree.

When the FDM STACK 515 calculates the root hash value for the data object X, the FDM APP 510 receives a notification and correspondingly requests notarization of data object X back to the FDM STACK 515. The FDM STACK 515 notarized the calculated root hash value by executing a transaction to store the root hash value in blockchain node 520 of the blockchain network 550. The notarization may be performed as discussed above by a notarization service, such as the notarization service 240 at FIG. 2, or the notarization service 327 at FIG. 3. Once notarization is performed, the calculated root hash value is stored in the blockchain node 520, and is transmitted into the blockchain network 550. Blockchain node 525 may access the stored hash for data object X and may copy the hash and create a record at the FDM STACK 530.

System A 505 may receive a request from system B 540 to share data related to data object X. As data object X is with defined visibility rules for different visibility levels associated with the different partner system, it should be evaluated what data from data object X should be shared with system B 540. The system A 505 may communicate the request for sharing of data with the FDM APP 510 and the FDM APP 510 may send a request to the FDM STACK 515 for the received sharing request.

At the FDM STACK 515, the request may be evaluated to determine the data object that is related to the sharing request and the receiving party for the sharing. Further, based on the provided input with identification of the data object, namely, data object X, and the receiving party—system B 540, visibility rules for the data object X in relation to system B may be determined. For example, system B 540 may be associated with a public view only, meaning that system B 540 may receive a restricted view of the properties that are defined as public.

The FDM STACK 515 may generate a view of the data object X that correspond to the public visibility criteria. For example, FDM STACK 515 may send data as presented below in Table 5 below.

TABLE 5

```
{
  "type": "MaterialItem",
  "consortiumMemberId": "Bayer",
  "details":
  {
    "MaterialId": "2080240",
    "BatchId": "3274831",
```

TABLE 5-continued

```
    }
}
```

Further, the FDM STACK 515 may generate a Merkle proof for the shared data. The Merkle proof may be send to the FDM STACK 530 of system B, as proof of authenticity of shared data for data object X. The data for the data object X as presented in Table 6 may be shared between system A 505 and system 540 though a messaging service of the FDM STACK 530 that they have correspondingly configured, as discussed above. The sharing of data may not be made through the blockchain network 550.

The FDM APP of system B received a view of data for data object X. For example, the data view corresponds to the content presented at Table 6. FDM APP 535 of system B evaluates whether the received data for data object X is authentic based on the received Merkle proof provide by the FDM Stack 515 and the root hash that is stored in the blockchain network 550 at blockchain node 520. As system B 540 is a partner system, system B 540 may be configured to access the stored root hashes and copy them at the FDM STACK 530 of system B. The FDM Stack 530 uses the Merkle proof to recalculate a root hash value and compared the recalculated root hash value with the saved hash for data object X. The FDM Stack 530 may be configured to receive the saved hash for data object X from blockchain node 525 of system B. If they correspond, which is the case in the current example, system B 540 may be notified that trusted data for data object X is received. Such data may be further evaluated by system B in different scenarios.

As described, the stored root hash node is for a data object where visibility levels are defined, and there is a single root hash node that can be used for verifying authenticity of data, such as partial data views corresponding to one or more of the visibility levels. In another example, a third partner system, such as system C (not depicted in FIG. 5) that is associated with a private visibility level, may request and receive data for data object X from system A 505. When system A 505 shares data with system C, all data for data object X is shared, as this corresponds to private visibility level. System A 505 may provide a Merkle proof for authenticity of the shared data. the FDM STACK 515 of System A 505 may calculate the Merkle proof based on the determiner view for System C. The computed Merkle proof for system C is different from the computed Merkle proof for the shared private view for System B 540. The Merkle proof computed for System C may be used to compare with the root hash value that is stored in the blockchain network to determine authenticity of the shared data. In such manner, different Merkle proofs may be used to recalculate a root hash value that can be compared with the root hash value that is stored in the blockchain network 550.

Figure 6:
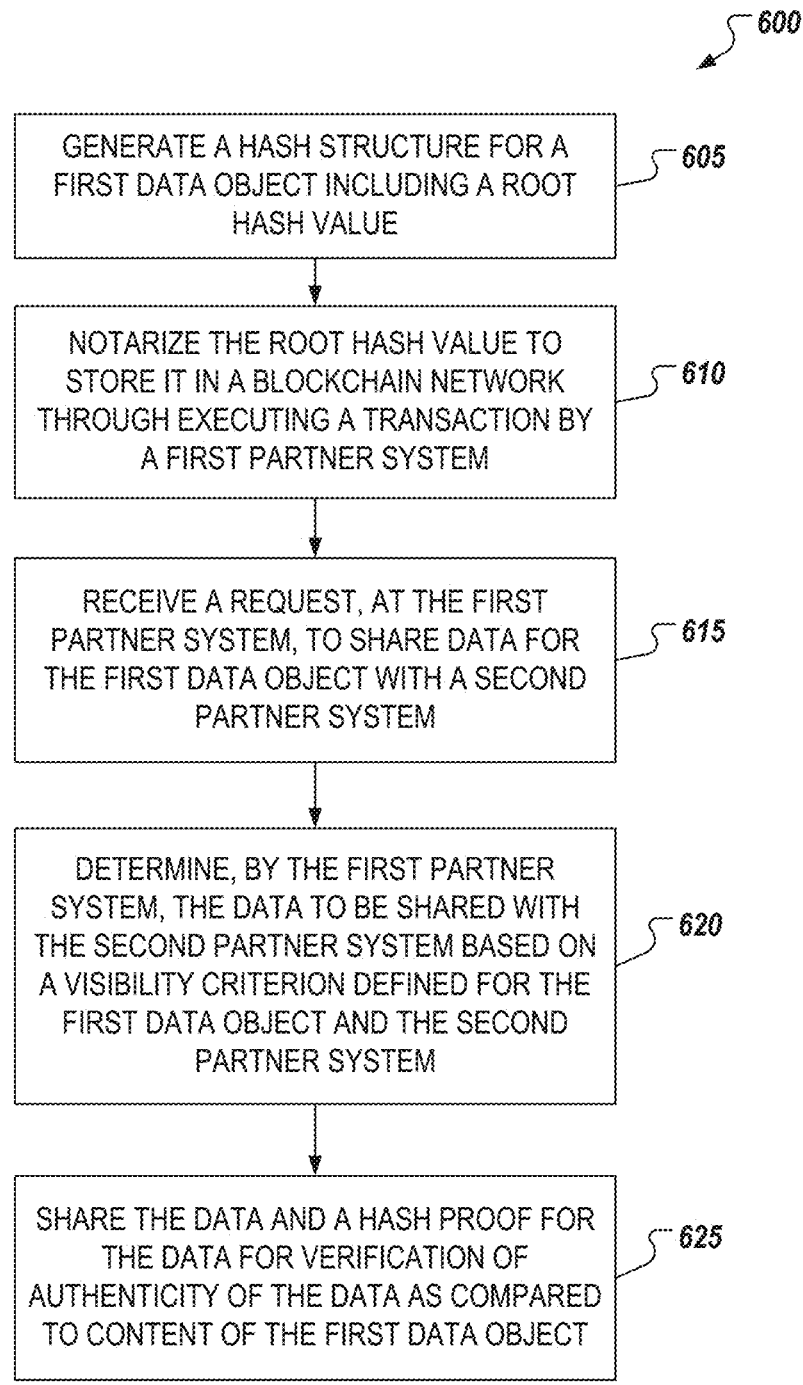
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

In accordance with implementations of the present disclosure, the method is provided for federated data management between partner system from a set of partner systems associated with a blockchain network. For example, the blockchain network may be such as the discussed blockchain network 112 at FIG. 1, the blockchain network 270 at FIG. 2, the blockchain network 370 at FIG. 3, and the like. The blockchain network may be established for notarization of root hash values in relation to data objects managed by systems from a set of partner system configured to communicate with the blockchain. The root hash values may be generated based on generating a hash structure for the data object, such as the hash structure described in relation to FIG. 4. The hash structure may be a Merkle tree hash, and the root hash value may be a Merkle root hash value. The hash structure defined for the data object may define one or more visibility levels for key-value pairs of the data object. For example, a set of key-value pair objects may be associated with a first visibility level of the data object, where the set is associated correspondingly with properties of the data object.

At 605, a hash structure for a first data object is generated. The first data object may be an object associated with one partner system of the set of partner system. For example, the object may be a data object such as a purchase order document, an object defined for a material at a supply chain system, and the like. The first data object may be defined with a set of properties. For example, an object defining a material item may have properties such as material number, material type, production date, price, quantity, and the like. The data object defined values for these properties to form key-value pair objects. In some examples, one property may be associated with a number of corresponding values to form multiple key-value pair objects associated with the property. The hash structure that is generated for the first data object includes a first root hash value. The hash structure maps one or more sets of properties of the first data object with corresponding one or more visibility levels for the first data object. For example, prices information for a given item as defined in a data object may be limited to be provided only to restricted set of systems from the set of partner system. In such cases, for example, a first visibility level associated with the prices may be defined to include the prices data, and another visibility level may be defined to exclude the prices data. In some other examples, different price data may be provided to different partner systems, which can be configured with different visibility levels.

In some implementations, when the hash structure is generated for the first data object, a map may be defined to include one or more visibility levels for key-value pair objects of the first data object. The map may group a set of the properties of the first data object. Defined groupings of properties and corresponding key-value pair objects may be hashed independently and then concatenated in a common hash value. According to implementations of the present disclosure, groupings of key-value pair objects corresponding to different visibility levels are hashed as a group and subsequently hashed group value are hashed to generate the root hash value.

In some implementations, the hash structure may be a Merkle tree hash structure, where the first root hash value is a Merkle tree root hash value. The hash structure outlined as a map of different visibility levels may be such as the describe below example hash structure at FIG. 4. The map may define sets of the properties of the first data objects to corresponds to different visibility levels. For example, a first set of properties from the one or more sets of properties is associated with a set of key-value pair objects of a first visibility level. A second set of the properties of the first data object may be associated with a second visibility level, the first set of the properties are different from the second set of the properties.

In some embodiments, some of the key-value pairs may be associated with private properties that are not to be shared with all of the partner systems of the blockchain network.

For example, a property defining a price of a material item stored in a data object defined for the material item may be configured as private, and a key-value pair defining the price and the price value may be grouped with other private properties and hash as a concatenated value with other hashed key-value pair objects. In some cases, the price value hash may be concatenated with the quantity value hash and mapped to a private visibility level.

According to implementations of the present disclosure, when visibility levels for sharing data of a data object are defined, the hash structure may be structure to map different groupings of properties to correspond to the defined visibility levels. For example, as discussed above in relation to the example of FIG. 4, a data object such as a material data object defined at a supply chain application, may be defined with two different visibility levels. A first visibility level includes a restricted set of properties from all of the properties, and a second visibility level to correspond to a visibility level revealing data for all of the properties.

At 610, the first root hash value is notarized to store the first root hash value in the blockchain network. The first root hash value may be notarized by executing a transaction at the blockchain network. A first partner system from the set of partner systems to the blockchain network may send a transaction request to the blockchain network to store the first root hash value.

The first root hash value may be determined to correspond to configurations defined for sharing of the first data object. For example, the first data object may define different visibility requirements for different partner systems of the set of partner systems of the blockchain network.

At 615, a request is received at the first partner system. The request is for sharing of data of the first data object to a second partner system from the set.

At 620, the first partner system determined the data to be shared with the second partner system. The determination of the data to be shared may be based on a visibility criterion defined in relation to the first data object. The hash structure associated with the first data object may define mappings for different visibility levels, each associated with a different partner system of the set of partner system. The data that is determined to be shared may be based on evaluation of different visibility levels as defined for the first data object and encoded in the hash structure. When there is a visibility level determined as relevant to the second partner system, the data associated with that visibility level may be provided to the second system. The data to be shared with the second partner systems includes a set of key-value pair objects associated with properties of the first data objects related to a first visibility level. For example, for the first data object two visibility levels are defined, where a first visibility level is associated with a set of key-value pair objects corresponding to a subset of properties.

At 625, the data that is determined to be shared by the first partner system to the second partner system is shared. In addition, a hash proof for the data for verification of authenticity of the data as compared to content of the first data object, the hash proof being generated by the first partner system based on the set of key-value pair objects. According to implementations of the present disclosure, the hash proof is a Merkle proof that defines a minimum set of hash values from the hash structure for the first data object to be used to calculate a root hash value and verify authenticity of the data by comparing with the first root hash value.

According to embodiments of the present disclosure, the example process 600 may further include that the second partner system calculated the root hash value based on the hash proof for the first data object. The hash proof may be a Merkle proof and the root hash value may be a Merkle tree root hash value. Further, the root hash value is evaluated to determine whether root hash value corresponds to the first root hash value. Based on the evaluation, it may be determined whether the data that is shared is authentic or tampered with.

In some implementations, in response to determining that the root hash value correspond to the first root hash value, it may be determined whether the first root hash value is pointed by another root hash value in a stored chain of notarized root hash values at the blockchain network. When the first root hash value is a leaf node of the stored chain, determining the first data object as a current version of a document associated with the first data object.

In some example, one property of the properties of the first data object may be associated with multiple key-value pairs. These multiple key-value pairs may be defined in the first data object as corresponding to different partner systems of the set of partner systems of the blockchain network. A set of key-value pair objects may be associated with a visibility level associated with a partner system from the partner systems.

Figure 7:
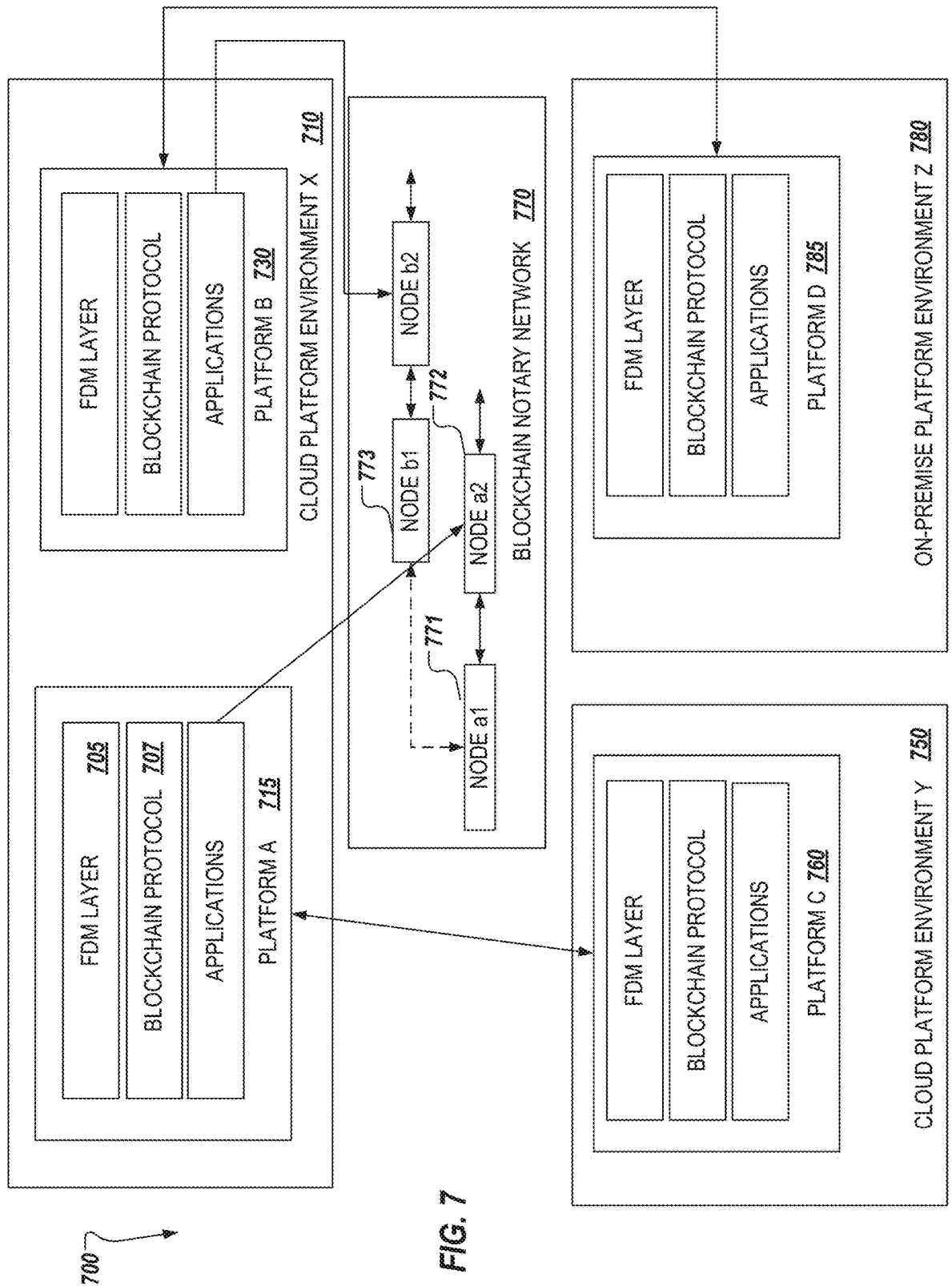
FIG. 7 depicts an example conceptual architecture in accordance with implementations of the present disclosure.

FIG. 7 depicts an example conceptual architecture 700 in accordance with implementations of the present disclosure.

According to implementations of the present disclosure, transaction chains may be created by objects referencing each other. Such transactions and objects may be created at systems that are configured to communicate about data authenticity based on a blockchain network. The systems may be partner systems such as the partner systems described with reference to FIGS. 1, 2, 3, 4, 5 and 6. For example, a product may reference its ingredients, or a sales order may reference a purchase order.

The example conceptual architecture 700 supports different references between data object that facilitate validation of authenticity of shared data content based on notarized root hash values at a blockchain network. According to implementations, history and tracking of versions of data objects can be performed. The example architecture 700 provides two types of references to be defined for data objects that are stored in a blockchain notary network 770—an object reference and a notarization reference. The blockchain notary network 770 may be such as the blockchain network discussed above in relation to FIGS. 1 to 6. The blockchain notary network 770 includes nodes that are organized in a graph structure (e.g., acyclic graph structure) with references. Some of the references may be object references and some of the references may be notarization references. These references are hash-based references. The definition of references between nodes at the blockchain notary network 770 may be provided based on the implemented logic for data objects and data object management.

When data objects are notarized, the notarization include execution of a transaction. The transaction may provide root hash values that are already stored in the blockchain notary network 770 as transaction input. In such cases, one root hash value may consume a previously stored root hash value. When a hash value consumes a previously stored hash value, then a notarization reference may be defined. Notarization references are hash-based, as when a first root hash consumes another second root hash, it may be defined that a newer version of the data object is provided which is associated with the first root hash.

In other cases, data objects may refer to each other, but not in the sense of defining newer subsequent version of the data object. This may happen in the example when one data object, for example, an invoice may refer to material item data objects that are included in the invoice.

A difference in the two types of references is whether two data objects are referring each other or they are defined as different version of the same entity.

When an object reference is defined, it may be interpreted as implicitly referring to the newest version at any given point in time. Data objects that are referenced with object references may change, but the reference defined between them continues to exist.

When a notarization references is defined, it may be interpreted that a previous data object has been altered to a new version. If the referenced data object is updated, the notarization reference still points to the old version as the notarization reference corresponds to the consumed data object.

In example cases when a data object is a document, when a document is notarized, the old version may be consumed. This means that the reference chain exists on the blockchain network and is visible to everyone. Definition of such notarization references can be used to notarize and confirm the most recent version of a document in a public, auditable manner. Semantically, a notarization reference expresses that a newer version of a previously notarized object is created.

In yet another example, a document may simply reference another document without claiming to be its newer version. In such case, the reference may be defined as an object reference. By defining such a reference, the document does not consume the other document. This may be the case when documents have a different owner. Defined identification references between data objects may not be used to determine a current version of a data object. It may be possible to define multiple document referencing the same predecessor with object references.

According to implementations of the current disclosure, multiple platform environment are defined to collaborate through the blockchain notary network 770. The platform environments include a cloud platform environment X 710, a cloud platform environment Y 750, an on-premise platform environment Z 780. These platforms environments are of different technology and may be provided by different platform providers. These environments are associated with different technology requirements for running applications. The environments provide environments for running and managing different software applications, software service, and the like. The cloud platform environment X 710 includes two cloud platform—a platform A 715 and a platform B 730. The cloud platform environment Y 750 includes a platform C 760. The cloud platform environments X 710 and Y 750 may be provided by different platform providers and may have different implementations and provide different services. The on-premise platform environment Z 780 includes a platform D 785.

Applications and/or application services are running on the platforms provided by the different platform environments 710, 750, and 780. These applications and/or application services may corresponds to the technology of the platform environments. The platforms 715, 730, 760, and 785 are implemented based on different technology and therefore the applications running on top of them are associated with specific and different hardware and software requirements and configurations.

The platforms 715, 730, 760, and 785 are provided with a federated data management (FDM) layer, such as the FDM layer 705. Further, the platforms are provided with blockchain services, such as the blockchain service 707 at the platform A 715. The FDM layers and the blockchain services may be such as the describes federated data management layers in relation to FIGS. 1 to 6. The blockchain services facilitate the communication for execution of transactions between the different platforms and the blockchain notary network 770. As discussed above, the FDM layer 705 provide notarization services, visibility services, messaging services, event handling services, and the like. The provided services may provide functionality in relation to data objects created at the platforms and according to implementations of the present disclosure.

In some implementations, an application running on platform A 715 may create a data object and notarize a root hash node for the data object, for example, store the root hash node at a NODE a2 772. The notarization of the root hash node at the blockchain notary network 770 may be performed according to the descriptions herein with reference to FIGS. 2, 3, 4, 5 and 6. The notarization of the root hash node may be performed through executing a transaction, where a NODE a1 771 is provided as input. Based on such input for the transaction execution, the NODE a1 711 is consumed by the NODE a2 772. A notarization references is defined between the two nodes and corresponding data objects according to implementations of the present disclosure. For example, the NODE a1 711 may be associated with a previous version of the data object that is associated with the NODE a2 772.

The NODE a1 771 may be defined to include an object reference to another root hash value that is notarized by storing the root hash value in the blockchain notary network 770. For example, the NODE a1 771 may be include a notarized hash root for a bid data object that is created in relation to another object, such as a request for quotation (RFQ) object. The RFQ object may be notarized by storing a root hash value at NODE b1 773. The NODE a1 771 refers by identification number for the NODE b1 773, as the bid is for that RFQ. The owner of the bid associated with NODE a1 771 may notarize a second bid version by storing the NODE a2 772, which is a notarization references that defines a newer version and consumes the root hash node at the NODE a1 771. The defined reference is a notarization reference as the newer version is replacing an older version.

For example, in an actual scenario of offers and bids, when the RFQ is issued. by a system as a data object, RFQ is notarized on the blockchain notary network 770 by storing the NODE b1 773 and the RQF may be shared with bidders (other systems) by a peer-to-peer communication channel. If the RFQ has to refer to other documents (e.g. relevant legislation) that were previously notarized, such a reference may be defined as a hash-based business reference, as it wants to refer to a specific version, and not to consume those documents. Such references may be defined as object references, similar to the reference defined between the NODE a1 771 and the NODE b1 773. An RFQ may be updated over time. In this case, the new RFQ version may notarized to consuming the old one. Between the two version of the RFQ, a hash-based notarization reference may be defined. When a bidder (represented by a partner system) wants to submit a bid, the corresponding partner system notarizes the bid data object at the blockchain notary network 770. Data for the bid may be shared with other partner systems in a peer-to-peer manner. When a new bid is created, the new bid may be notarized to consume a previous bid version, and a hash-based notarization references may be defined. Such references may be defined in the same manner as the reference defined between the NODE a1 771 and the NODE a2 772. The bids and the RFQs may refer to each other by object references. The bids do not update the RFQs, as the bidder does not own the RFQ, and notarized root hash values at the blockchain notary network 770 does not consumed each other. The references are content-based rather than logical as they refer to a specific version of the RFQ and may not automatically be valid for future versions. When a bid is updated, it may still refer to the RFQ with an object reference. The root hash value stored for the notarized bid may contain a notarization reference to the previous version of the bid and the stored root hash value for that previous version. In some examples, it may not be necessary to reference the previous bid with a notarization reference, as the logic of the systems may be configured to interpret that the bid with the latest timestamp is always the current version.

Figure 8:
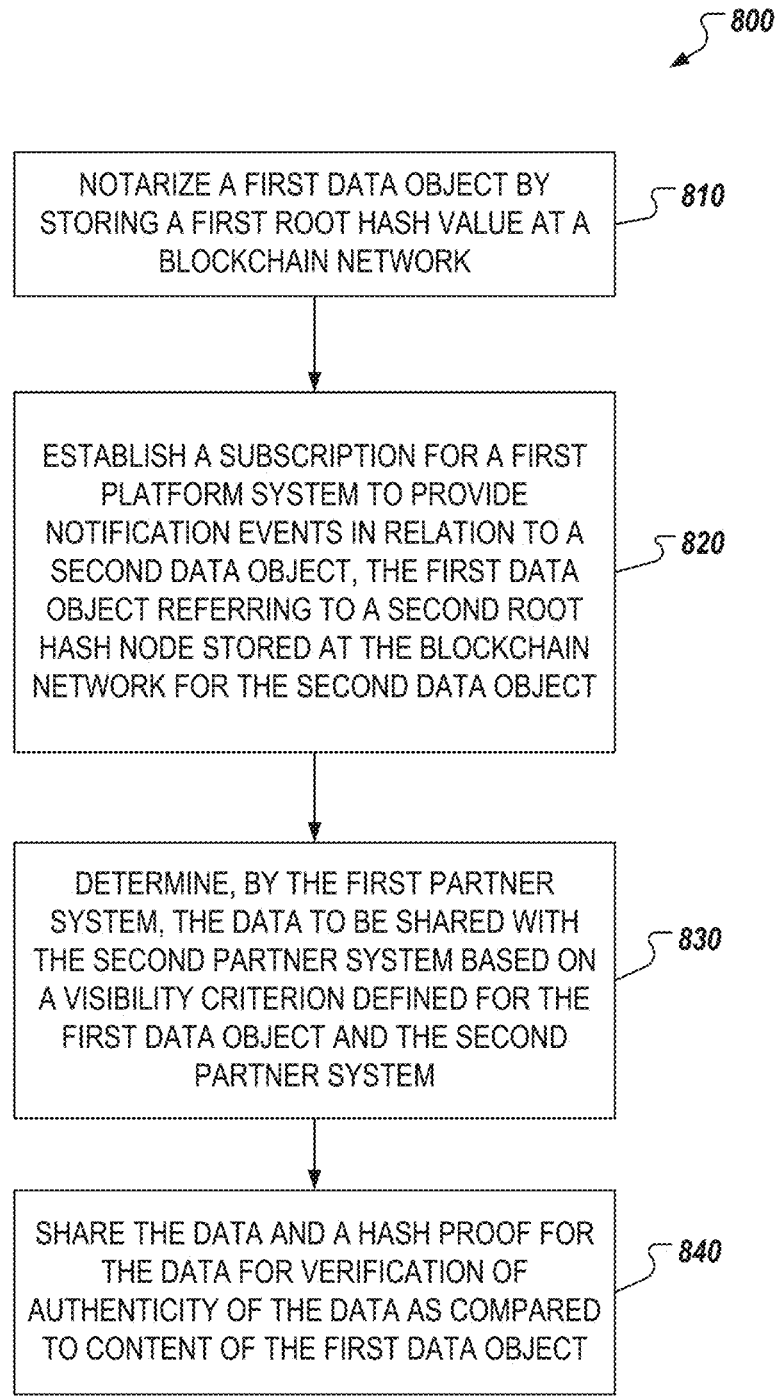
FIG. 8 depicts an example process that can be executed in accordance with implementations of the present disclosure.

The manner of communication between the different platform systems—the platforms 715, 730, 760, and 785, may be configured to be performed as discussed in relation to the example process 800 at FIG. 8.

FIG. 8 depicts an example process 800 that can be executed in accordance with implementations of the present disclosure. In some examples, the example process 800 is provided using one or more computer-executable programs executed by one or more computing devices.

The example process 800 defines a computer implemented method for notarized communication between a plurality of platform systems through a blockchain network. The blockchain network may be such as the discussed blockchain networks in the present disclosure. Notarization of data objects may be performed according to implementations described herein with reference to FIGS. 3, 5, and 6. The platform systems may be instantiated with notarization interfaces for a notarized communication. Such notarization interfaces may be provided by federated data management layers instantiated for the systems.

At 810, a first data object is notarized by storing a first root hash value for a first data object at the blockchain network. The first root hash value is notarized in response to a transaction request executed at the blockchain. The transaction request is received through a first notarization interface instantiated at a first platform system.

In some implementations, the transaction request comprises as input a fourth root hash value, where the fourth root hash value is stored in the blockchain network. The first root hash value may include a notarization reference to the fourth root hash value to define that the first data object is a subsequent version of a fourth data object associated with the fourth root hash value.

At 820, a subscription is established for the first platform system to provide notification events in relation to a second data object. The second root hash value is notarized by a second platform system. The first root hash value comprising an object reference to a second root hash value for the second data object.

At 830, a notification event is sent in relation to the second data object to the first platform system. The notification event comprises a third root hash value of a third data object that is notarized by storing the third root hash value in the blockchain network. The third data object is notarized by the second platform system through a second notarization interface and including a notarization reference to the second root hash value associated with the second data object.

In some implementations, the example process 800 further comprises instantiation of a plurality of notarization interfaces at the plurality of platform systems for notarized communication. The instantiated interfaces may facilitate communication of platform systems having different technology requirements to communicate with the blockchain network and the other platform systems. For example, the first platform system from the platform systems is a cloud platform system, and the second platform system is an on premise platform system.

In some implementations, the process 800 further includes establishing a chain of notarized root hashes at the blockchain network. The chain may include the first root hash value and the fourth root hash value to provide tracking of versions of a first document at the blockchain network. The first document may be generated at the first platform system in relation to a second document generated at the second platform system. The first data object and the fourth data object may be defined as different versions of the first document. And the second data object and the third data object may be defined different versions of the second document. The first and second document may corresponds to the RFQ and the bid scenario discussed with reference to FIG. 7.

In some implementations, the process 800 further includes receiving a request, at a second notarization interface at the second platform system. The request is for sharing data associated with the third data object, the request being associated with sharing the data with the first platform system. The second platform system may determine the data to be shared with the first platform system based on a visibility criterion defined in relation to the third data object and the first platform system. The determined data may include a set of key-value pair objects associated with a first visibility level of one or more visibility levels of the third data object. The data is shared and a hash proof for the data for verification of authenticity of the data as compared to content of the third data object is provided. The hash proof is generated by the second platform system based on the set of key-value pair objects. The hash proof may be such as the hash proof and the Merkle hash proof described herein with reference to FIG. 2, 3, 4, 5, 6.

In some implementations, the first platform system may send a data requests to the second platform system. In response to request, the first platform system, may receive data associated with the third data object and a hash proof for the data. The first platform system may calculate a root hash value based on the hash proof for the third data object. The hash proof may be a Merkle proof and the root hash value being a Merkle tree root hash value. The first platform system may evaluate the root hash value to determine whether the root hash value corresponds to the third root hash value to verify authenticity of the data being shared.

In some implementations, in response to notarizing the first root hash value by executing a transaction to store the first root hash value in the blockchain network, the first root hash for the first data object is transmitted to the plurality of platform systems related to the blockchain network.

Figure 9:
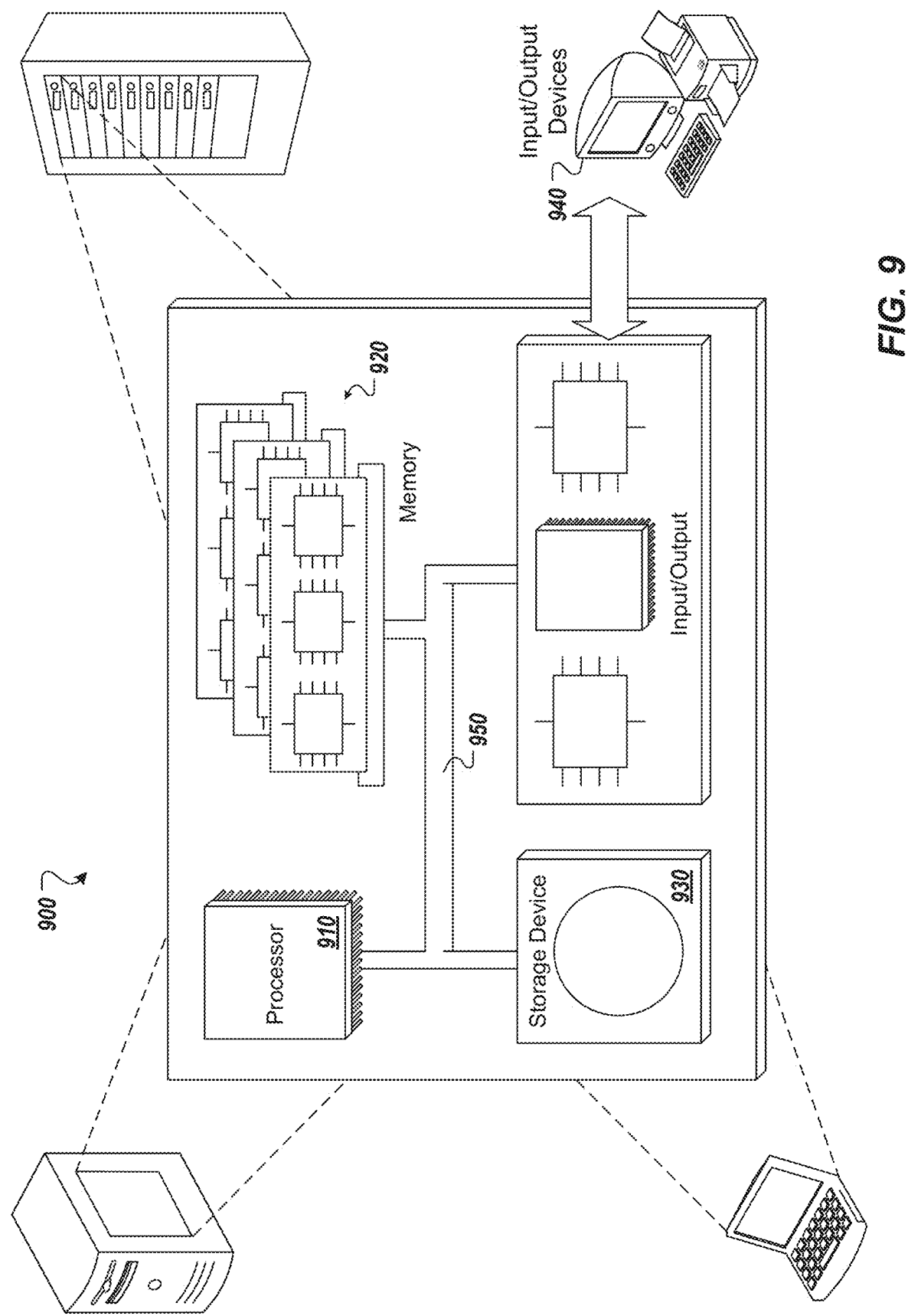
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, 940 are interconnected using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. In some implementations, the memory 920 is a volatile memory unit. In some implementations, the memory 920 is a non-volatile memory unit. The storage device 930 is capable of providing mass storage for the system 900. In some implementations, the storage device 930 is a computer-readable medium. In some implementations, the storage device 930 may be a floppy disk device, a hard disk device, an optical disk device, or a tape device. The input/output device 940 provides input/output operations for the system 900. In some implementations, the input/output device 940 includes a keyboard and/or pointing device. In some implementations, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer implemented method for notarized communication between a plurality of platform systems, the method being executed by one or more processors and comprising:
   notarizing a first data object by storing a first root hash value for the first data object at a blockchain network;
   establishing a subscription for a first platform system to provide notification events in relation to a second data object, the first root hash value comprising an object reference to a second root hash value for the second data object, wherein the second root hash value is notarized at the blockchain network by a second platform system, wherein the first root hash value is notarized at the blockchain network without taking the second root hash value as input and without replacing the second root hash value with the first root hash value, and wherein the second data object is not a version of the first data object;
   notarizing a third root hash value for a third data object at the blockchain network, wherein the third root hash value includes a first notarization reference to the second root hash value associated with the second data object to define that the third data object is a newer version of the second data object that is notarized at the blockchain network by taking the second root hash value as input and providing a signature to replace the second root hash value with the third root hash value when notarizing the third root hash value; and
   in response to i) notarizing the third root hash value for the third data object as the newer version of the second data object at the blockchain network and ii) the first root hash value for the first data object comprising the object reference to the second root hash value notarized at the blockchain network for the second data object, sending a notification event in relation to the third data object as the newer version of the second data object to the first platform system.

2. The method of claim 1, further comprising:
instantiating a plurality of notarization interfaces at the plurality of platform systems for the notarized communication, wherein the first platform system from the plurality of platform systems is a cloud platform system, and the second platform system is an on premise platform system.

3. The method of claim 1, wherein the first root hash value is notarized in response to a transaction request received through a first notarization interface instantiated at the first platform system, and wherein the transaction request comprises as input a fourth root hash value, the fourth root hash value being stored at the blockchain network, wherein the first root hash value includes a second notarization reference to the fourth root hash value to define that the first data object is a subsequent version of a fourth data object associated with the fourth root hash value.

4. The method of claim 3, further comprising:
establishing a chain of notarized root hashes at the blockchain network, the chain including the first root hash value and the fourth root hash value to provide tracking of versions of a first document at the blockchain network.

5. The method of claim 3, wherein a first document is generated at the first platform system in relation to a second document generated at the second platform system, wherein the first data object and the fourth data object are different versions of the first document, and the second data object and the third data object are different versions of the second document.

6. The method of claim 1, further comprising:
receiving a request, at a second notarization interface at the second platform system, for sharing data associated with the third data object, the request being associated with the first platform system;
determining, by the second platform system, the data to be shared with the first platform system based on a visibility criterion defined in relation to the third data object and the first platform system, wherein the data includes a set of key-value pair objects associated with a first visibility level of one or more visibility levels of the third data object; and
sharing the data and a hash proof for the data for verification of authenticity of the data as compared to content of the third data object, the hash proof being generated by the second platform system based on the set of key-value pair objects.

7. The method of claim 1, further comprising:
in response to a data request from the first platform system to the second platform system, receiving, at the first platform system, data associated with the third data object and a hash proof for the data;
calculating, at the first platform system, a root hash value based on the hash proof for the third data object, the hash proof being a Merkle proof and the root hash value being a Merkle tree root hash value; and
evaluating the root hash value to determine whether the root hash value corresponds to the third root hash value to verify authenticity of the data being shared.

8. The method of claim 1, further comprising:
in response to notarizing the first root hash value at the blockchain network, transmitting the first root hash for the first data object to the plurality of platform systems related to the blockchain network.

9. A non-transitory computer-readable storage medium coupled to one or more processors and having instructions stored thereon which, when executed by the one or more processors, cause the one or more processors to perform operations for notarized communication between a plurality of platform systems, the operations comprising:
notarizing a first data object by storing a first root hash value for the first data object at a blockchain network;
establishing a subscription for a first platform system to provide notification events in relation to a second data object, the first root hash value comprising an object reference to a second root hash value for the second data object, wherein the second root hash value is notarized at the blockchain network by a second platform system, wherein the first root hash value is notarized at the blockchain network without taking the second root hash value as input and without replacing the second root hash value with the first root hash value, and wherein the second data object is not a version of the first data object;
notarizing a third root hash value for a third data object at the blockchain network, wherein the third root hash value includes a first notarization reference to the second root hash value associated with the second data object to define that the third data object is a newer version of the second data object that is notarized at the blockchain network by taking the second root hash value as input and providing a signature to replace the second root hash value with the third root hash value when notarizing the third root hash value; and
in response to i) notarizing the third root hash value for the third data object as the newer version of the second data object at the blockchain network and ii) the first root hash value for the first data object comprising the object reference to the second root hash value notarized at the blockchain network for the second data object, sending a notification event in relation to the third data object as the newer version of the second data object to the first platform system.

10. The computer-readable medium of claim 9, further comprising instructions, which when executed causes the one or more processors to perform operations comprising:
instantiating a plurality of notarization interfaces at the plurality of platform systems for the notarized communication, wherein the first platform system from the plurality of platform systems is a cloud platform system, and the second platform system is an on premise platform system.

11. The computer-readable medium of claim 9, wherein the first root hash value is notarized in response to a transaction request received through a first notarization interface instantiated at the first platform system, and wherein the transaction request comprises as input a fourth root hash value, the fourth root hash value being stored at the blockchain network, wherein the first root hash value includes a second notarization reference to the fourth root hash value to define that the first data object is a subsequent version of a fourth data object associated with the fourth root hash value.

12. The computer-readable medium of claim 11, further comprising instructions, which when executed causes the one or more processors to perform operations comprising:
establishing a chain of notarized root hashes at the blockchain network, the chain including the first root hash value and the fourth root hash value to provide tracking of versions of a first document at the blockchain network, wherein the first document is generated at the first platform system in relation to a second document generated at the second platform system, wherein the first data object and the fourth data object are different versions of the first document, and the second data object and the third data object are different versions of the second document.

13. The computer-readable medium of claim 9, further comprising instructions, which when executed causes the one or more processors to perform operations comprising:

receiving a request, at a second notarization interface at the second platform system, for sharing data associated with the third data object, the request being associated with the first platform system;

determining, by the second platform system, the data to be shared with the first platform system based on a visibility criterion defined in relation to the third data object and the first platform system, wherein the data includes a set of key-value pair objects associated with a first visibility level of one or more visibility levels of the third data object; and sharing the data and a hash proof for the data for verification of authenticity of the data as compared to content of the third data object, the hash proof being generated by the second platform system based on the set of key-value pair objects.

14. The computer-readable medium of claim 9, further comprising instructions, which when executed causes the one or more processors to perform operations comprising:

in response to a data request from the first platform system to the second platform system, receiving, at the first platform system, data associated with the third data object and a hash proof for the data;

calculating, at the first platform system, a root hash value based on the hash proof for the third data object, the hash proof being a Merkle proof and the root hash value being a Merkle tree root hash value; and evaluating the root hash value to determine whether the root hash value corresponds to the third root hash value to verify authenticity of the data being shared.

15. The computer-readable medium of claim 9, further comprising instructions, which when executed causes the one or more processors to perform operations comprising:

in response to notarizing the first root hash value at the blockchain network, transmitting the first root hash for the first data object to the plurality of platform systems related to the blockchain network.

16. A system, comprising:

a computing device; and a computer-readable storage device coupled to the computing device and having instructions stored thereon which, when executed by the computing device, cause the computing device to perform operations for notarized communication between a plurality of platform systems, the operations comprising:

notarizing a first data object by storing a first root hash value for the first data object at a blockchain network;

establishing a subscription for a first platform system to provide notification events in relation to a second data object, the first root hash value comprising an object reference to a second root hash value for the second data object, wherein the second root hash value is notarized at the blockchain network by a second platform system, wherein the first root hash value is notarized at the blockchain network without taking the second root hash value as input and without replacing the second root hash value with the first root hash value, and wherein the second data object is not a version of the first data object;

notarizing a third root hash value for a third data object at the blockchain network, wherein the third root hash value includes a first notarization reference to the second root hash value associated with the second data object to define that the third data object is a newer version of the second data object that is notarized at the blockchain network by taking the second root hash value as input and providing a signature to replace the second root hash value with the third root hash value when notarizing the third root hash value; and in response to i) notarizing the third root hash value for the third data object as the newer version of the second data object at the blockchain network and ii) the first root hash value for the first data object comprising the object reference to the second root hash value notarized at the blockchain network for the second data object, sending a notification event in relation to the third data object as the newer version of the second data object to the first platform system.

17. The system of claim 16, wherein the computer-readable storage device includes further instructions, which when executed by the computing device cause the computing device to perform operations comprising:

instantiating a plurality of notarization interfaces at the plurality of platform systems for the notarized communication, wherein the first platform system from the plurality of platform systems is a cloud platform system, and the second platform system is an on premise platform system.

18. The system of claim 16, wherein the computer-readable storage device includes further instructions, which when executed by the computing device cause the computing device to perform operations comprising:

establishing a chain of notarized root hashes at the blockchain network, the chain including the first root hash value and a fourth root hash value to provide tracking of versions of a first document at the blockchain network, wherein the first root hash value is notarized in response to a transaction request received through a first notarization interface instantiated at a first platform system, and wherein the transaction request comprises as input the fourth root hash value, the fourth root hash value being stored at the blockchain network, wherein the first root hash value includes a second notarization reference to the fourth root hash value to define that the first data object is a subsequent version of a fourth data object associated with the fourth root hash value, wherein the first document is generated at the first platform system in relation to a second document generated at the second platform system, wherein the first data object and the fourth data object are different versions of the first document, and the second data object and the third data object are different versions of the second document.

19. The system of claim 16, wherein the computer-readable storage device includes further instructions, which when executed by the computing device cause the computing device to perform operations comprising:

receiving a request, at a second notarization interface at the second platform system, for sharing data associated with the third data object, the request being associated with the first platform system;

determining, by the second platform system, the data to be shared with the first platform system based on a visibility criterion defined in relation to the third data object and the first platform system, wherein the data includes a set of key-value pair objects associated with a first visibility level of one or more visibility levels of the third data object;

sharing the data and a hash proof for the data for verification of authenticity of the data as compared to content of the third data object, the hash proof being generated by the second platform system based on the set of key-value pair objects; and in response to notarizing the first root hash value at the blockchain network, transmitting the first root hash for the first data object to the plurality of platform systems related to the blockchain network.

20. The system of claim 16, wherein the computer-readable storage device includes further instructions, which when executed by the computing device cause the computing device to perform operations comprising:

in response to a data request from the first platform system to the second platform system, receiving, at the first platform system, data associated with the third data object and a hash proof for the data;

calculating, at the first platform system, a root hash value based on the hash proof for the third data object, the hash proof being a Merkle proof and the root hash value being a Merkle tree root hash value; and evaluating the root hash value to determine whether the root hash value corresponds to the third root hash value to verify authenticity of the data being shared.

* * * * *